(12) United States Patent
James et al.

(10) Patent No.: US 9,900,395 B2
(45) Date of Patent: *Feb. 20, 2018

(54) DYNAMIC NORMALIZATION OF INTERNET TRAFFIC

(71) Applicant: comScore, Inc., Reston, VA (US)

(72) Inventors: Derrick James, Arlington, MA (US); Jonathan H. Novick, Melrose, MA (US)

(73) Assignee: comScore, Inc., Reston, VA (US)

( * ) Notice: Subject to any disclaimer, the term of this patent is extended or adjusted under 35 U.S.C. 154(b) by 449 days.

This patent is subject to a terminal disclaimer.

(21) Appl. No.: 14/598,363

(22) Filed: Jan. 16, 2015

(65) Prior Publication Data

US 2015/0201031 A1    Jul. 16, 2015

Related U.S. Application Data

(63) Continuation-in-part of application No. 13/741,160, filed on Jan. 14, 2013, now Pat. No. 8,954,580, and a
(Continued)

(51) Int. Cl.
*G06F 15/16* (2006.01)
*H04L 29/08* (2006.01)
(Continued)

(52) U.S. Cl.
CPC ............ *H04L 67/22* (2013.01); *G06Q 10/04* (2013.01); *G06Q 30/02* (2013.01); *H04L 43/0876* (2013.01)

(58) Field of Classification Search
CPC ..... H04L 67/22; H04L 43/0876; G06Q 10/04; G06Q 30/02
See application file for complete search history.

(56) References Cited

U.S. PATENT DOCUMENTS 5,126,728 A    6/1992   Hall
5,583,763 A   12/1996   Atcheson et al.
(Continued)

FOREIGN PATENT DOCUMENTS

KR    20030040263    5/2003
KR    20050005592    1/2005
(Continued)

OTHER PUBLICATIONS

USPTO, "U.S. Appl. No. 13/359,901, Notice of Allowance dated Sep. 21, 2012", Sep. 21, 2012 , 10 pgs.
(Continued)

*Primary Examiner* — Moustafa M Meky
(74) *Attorney, Agent, or Firm* — Baker & Hostetler LLP

(57) ABSTRACT

The disclosure herein concerns a method of estimating Internet traffic including taking a size of a target population based on at least one of census data and third party data, identifying a percentage of the target population that displays an online behavior, receiving clickstream data at a host processing facility from a clickstream panel that connotes Internet activity of individual members of the clickstream panel, identifying a fraction of participants within the clickstream panel that exhibit the online behavior, and producing, at the host processing facility, an estimate of the target population's Internet activity by first scaling the clickstream data for the participants in the clickstream panel exhibiting the online behavior so that it matches the percentage in the target population and then scaling the data for all members of the clickstream panel by the relative size of the target population.

18 Claims, 8 Drawing Sheets

Related U.S. Application Data continuation-in-part of application No. 13/359,901, filed on Jan. 27, 2012, now Pat. No. 8,356,097.

(60) Provisional application No. 61/929,290, filed on Jan. 20, 2014, provisional application No. 61/636,388, filed on Apr. 20, 2012.

(51) Int. Cl.
  *H04L 12/26* (2006.01)
  *G06Q 10/04* (2012.01)
  *G06Q 30/02* (2012.01)

(56) References Cited

U.S. PATENT DOCUMENTS

| | | | |
|---|---|---|---|
| 5,749,081 A | 5/1998 | Whiteis | |
| 5,893,077 A | 4/1999 | Griffin | |
| 5,914,717 A | 6/1999 | Kleewein et al. | |
| 5,930,764 A | 7/1999 | Melchione et al. | |
| 6,055,570 A | 4/2000 | Nielsen | |
| 6,216,135 B1 | 4/2001 | Brodersen et al. | |
| 6,314,451 B1 | 11/2001 | Landsman et al. | |
| 6,334,108 B1 | 12/2001 | Deaton et al. | |
| 6,334,110 B1 | 12/2001 | Walter et al. | |
| 6,448,981 B1 | 9/2002 | Kaczmarski | |
| 6,519,571 B1 | 2/2003 | Guheen | |
| 6,574,587 B2 | 6/2003 | Waclawski | |
| 6,606,304 B1 | 8/2003 | Grinter et al. | |
| 6,707,422 B2 | 3/2004 | Sheynblat et al. | |
| 6,721,749 B1 | 4/2004 | Najm et al. | |
| 6,801,945 B2 | 10/2004 | Lin et al. | |
| 6,820,116 B1 | 11/2004 | Pyhalammi et al. | |
| 6,834,372 B1 | 12/2004 | Becker et al. | |
| 6,839,680 B1 | 1/2005 | Liu et al. | |
| 6,847,969 B1 | 1/2005 | Mathai et al. | |
| 6,904,408 B1 | 6/2005 | McCarthy et al. | |
| 6,934,687 B1 | 8/2005 | Papierniak et al. | |
| 6,934,748 B1 | 8/2005 | Louviere et al. | |
| 6,981,040 B1 | 12/2005 | Konig et al. | |
| 7,032,168 B1 | 4/2006 | Gerace et al. | |
| 7,035,855 B1 | 4/2006 | Kilger et al. | |
| 7,036,087 B1 | 4/2006 | Odom | |
| 7,162,451 B2 | 1/2007 | Berger et al. | |
| 7,243,075 B1 | 7/2007 | Shaffer et al. | |
| 7,249,032 B1 | 7/2007 | Close et al. | |
| 7,272,629 B2 | 9/2007 | Yamaura et al. | |
| 7,373,313 B1 | 5/2008 | Kahle et al. | |
| 7,386,466 B2 | 6/2008 | McLean et al. | |
| 7,395,259 B2 | 7/2008 | Bailey et al. | |
| 7,437,364 B1 | 10/2008 | Fredricksen et al. | |
| 7,478,035 B1 | 1/2009 | Wrench et al. | |
| 7,546,338 B2 | 6/2009 | Schran | |
| 7,558,822 B2 | 7/2009 | Fredricksen et al. | |
| 7,565,425 B2 | 7/2009 | Van Vleet et al. | |
| 7,730,120 B2 | 6/2010 | Singh et al. | |
| 7,797,371 B2 | 9/2010 | Singh et al. | |
| 7,814,139 B2 | 10/2010 | Singh et al. | |
| 7,883,527 B2 | 2/2011 | Matsuura et al. | |
| 7,890,451 B2 | 2/2011 | Cancel et al. | |
| 7,895,258 B2 | 2/2011 | Singh et al. | |
| 7,979,544 B2 | 7/2011 | Cancel et al. | |
| 8,024,447 B1 | 9/2011 | Garcia-Franco et al. | |
| 8,055,709 B2 | 11/2011 | Singh et al. | |
| 8,095,621 B2 | 1/2012 | Singh et al. | |
| 8,099,496 B2 | 1/2012 | Singh et al. | |
| 8,135,833 B2 * | 3/2012 | Cancel | G06Q 10/04 709/223 |
| 8,332,271 B1 | 12/2012 | Wilder et al. | |
| 8,516,591 B2 | 8/2013 | Fly et al. | |
| 8,560,596 B2 | 10/2013 | Schran | |
| 9,154,565 B2 * | 10/2015 | Monighetti | H04L 67/22 |
| 2001/0014868 A1 | 8/2001 | Herz et al. | |
| 2001/0032115 A1 | 10/2001 | Goldstein | |
| 2001/0051932 A1 | 12/2001 | Srinivasan et al. | |
| 2001/0056405 A1 | 12/2001 | Muyres et al. | |
| 2002/0004868 A1 | 1/2002 | Hagiwara | |
| 2002/0010757 A1 | 1/2002 | Granik et al. | |
| 2002/0016731 A1 | 2/2002 | Kupersmit | |
| 2002/0035498 A1 | 3/2002 | Kehoe et al. | |
| 2002/0038350 A1 | 3/2002 | Lambert et al. | |
| 2002/0042733 A1 | 4/2002 | Lesandrini et al. | |
| 2002/0042821 A1 | 4/2002 | Muret et al. | |
| 2002/0052782 A1 | 5/2002 | Landesmann | |
| 2002/0053078 A1 | 5/2002 | Holtz et al. | |
| 2002/0063735 A1 | 5/2002 | Tamir et al. | |
| 2002/0065912 A1 | 5/2002 | Catchpole et al. | |
| 2002/0095387 A1 | 7/2002 | Sosa et al. | |
| 2002/0099824 A1 | 7/2002 | Bender et al. | |
| 2002/0100042 A1 | 7/2002 | Khoo et al. | |
| 2002/0103680 A1 | 8/2002 | Newman | |
| 2002/0107730 A1 | 8/2002 | Bernstein | |
| 2002/0116348 A1 | 8/2002 | Phillips et al. | |
| 2002/0116531 A1 | 8/2002 | Chu | |
| 2002/0120528 A1 | 8/2002 | Hutten | |
| 2002/0123359 A1 | 9/2002 | Wei et al. | |
| 2002/0123926 A1 | 9/2002 | Bushold et al. | |
| 2002/0143933 A1 | 10/2002 | Hind et al. | |
| 2002/0143984 A1 | 10/2002 | Hudson Michel | |
| 2002/0196273 A1 | 12/2002 | Krause | |
| 2002/0198791 A1 | 12/2002 | Perkowski | |
| 2002/0198882 A1 | 12/2002 | Linden et al. | |
| 2003/0018677 A1 | 1/2003 | Mathur et al. | |
| 2003/0023715 A1 | 1/2003 | Reiner et al. | |
| 2003/0037124 A1 | 2/2003 | Yamaura et al. | |
| 2003/0050815 A1 | 3/2003 | Seigel et al. | |
| 2003/0053420 A1 | 3/2003 | Duckett et al. | |
| 2003/0056136 A1 | 3/2003 | Aweya et al. | |
| 2003/0101024 A1 | 5/2003 | Adar et al. | |
| 2003/0105719 A1 | 6/2003 | Berger et al. | |
| 2003/0110072 A1 | 6/2003 | Delurgio et al. | |
| 2003/0126095 A1 | 7/2003 | Allen | |
| 2003/0126250 A1 | 7/2003 | Jhanji | |
| 2003/0128818 A1 | 7/2003 | Kerr et al. | |
| 2003/0135405 A1 | 7/2003 | Townsend et al. | |
| 2003/0149696 A1 | 8/2003 | Nelson et al. | |
| 2003/0154162 A1 | 8/2003 | Danaher et al. | |
| 2003/0171977 A1 | 9/2003 | Singh et al. | |
| 2003/0189904 A1 | 10/2003 | Li | |
| 2004/0064449 A1 | 4/2004 | Ripley et al. | |
| 2004/0098229 A1 | 5/2004 | Error et al. | |
| 2004/0107363 A1 | 6/2004 | Monteverde | |
| 2004/0172389 A1 | 9/2004 | Galai et al. | |
| 2004/0177015 A1 | 9/2004 | Galai et al. | |
| 2004/0205119 A1 | 10/2004 | Streble et al. | |
| 2004/0249938 A1 | 12/2004 | Bunch | |
| 2005/0004889 A1 | 1/2005 | Bailey et al. | |
| 2005/0015723 A1 | 1/2005 | Light et al. | |
| 2005/0091673 A1 | 4/2005 | Rhoten et al. | |
| 2005/0222906 A1 | 10/2005 | Chen | |
| 2005/0234922 A1 | 10/2005 | Parekh et al. | |
| 2005/0235318 A1 | 10/2005 | Grauch et al. | |
| 2006/0004717 A1 | 1/2006 | Ramarathnam et al. | |
| 2006/0031205 A1 | 2/2006 | Perkins et al. | |
| 2006/0080554 A1 | 4/2006 | Mcdonald et al. | |
| 2006/0168054 A1 | 7/2006 | Burkhart et al. | |
| 2006/0212698 A1 | 9/2006 | Peckover | |
| 2006/0248452 A1 | 11/2006 | Lambert et al. | |
| 2006/0253434 A1 | 11/2006 | Beriker et al. | |
| 2007/0030528 A1 | 2/2007 | Quaeler et al. | |
| 2007/0043817 A1 | 2/2007 | Oliver et al. | |
| 2007/0055937 A1 | 3/2007 | Cancel et al. | |
| 2007/0061313 A1 | 3/2007 | Kahle et al. | |
| 2007/0198486 A1 | 8/2007 | Abrams et al. | |
| 2008/0071767 A1 | 3/2008 | Grieselhuber et al. | |
| 2008/0177778 A1 | 7/2008 | Cancel et al. | |
| 2008/0177779 A1 | 7/2008 | Cancel et al. | |
| 2008/0183664 A1 * | 7/2008 | Cancel | G06Q 30/02 |
| 2008/0183717 A1 | 7/2008 | Singh et al. | |
| 2008/0183718 A1 | 7/2008 | Singh et al. | |
| 2008/0183745 A1 * | 7/2008 | Cancel | G06Q 30/02 |
| 2008/0183796 A1 | 7/2008 | Singh et al. | |
| 2008/0183805 A1 | 7/2008 | Cancel et al. | |
| 2008/0183806 A1 | 7/2008 | Cancel et al. | |

(56) References Cited

U.S. PATENT DOCUMENTS

| | | | |
|---|---|---|---|
| 2008/0183867 | A1 | 7/2008 | Singh et al. |
| 2008/0183868 | A1 | 7/2008 | Singh et al. |
| 2008/0183869 | A1 | 7/2008 | Singh et al. |
| 2008/0183870 | A1 | 7/2008 | Singh et al. |
| 2008/0189253 | A1 | 8/2008 | Oliver et al. |
| 2008/0189254 | A1* | 8/2008 | Cancel .................. G06Q 30/02 |
| 2008/0189281 | A1* | 8/2008 | Cancel .................. G06Q 30/02 |
| 2008/0189408 | A1 | 8/2008 | Cancel et al. |
| 2008/0196098 | A1 | 8/2008 | Cottrell et al. |
| 2008/0250026 | A1 | 10/2008 | Linden et al. |
| 2008/0259155 | A1 | 10/2008 | McLelland et al. |
| 2008/0288635 | A1 | 11/2008 | Jaye |
| 2008/0300904 | A1 | 12/2008 | Malcolm |
| 2008/0301281 | A1 | 12/2008 | Wang et al. |
| 2009/0006995 | A1 | 1/2009 | Error et al. |
| 2009/0143064 | A1 | 6/2009 | Bernini et al. |
| 2009/0265243 | A1 | 10/2009 | Karassner et al. |
| 2010/0030894 | A1 | 2/2010 | Cancel et al. |
| 2011/0015982 | A1 | 1/2011 | Singh et al. |
| 2011/0143811 | A1 | 6/2011 | Rodriguez |
| 2011/0283356 | A1 | 11/2011 | Fly et al. |
| 2011/0296014 | A1* | 12/2011 | Cancel .................. G06Q 30/02 709/224 |
| 2011/0307331 | A1 | 12/2011 | Richard et al. |
| 2012/0054862 | A1 | 3/2012 | Jevans et al. |
| 2012/0131187 | A1 | 5/2012 | Cancel et al. |
| 2013/0073473 | A1* | 3/2013 | Heath .................... G06Q 30/02 705/319 |
| 2013/0159274 | A1* | 6/2013 | Silberstein ............. H04L 67/20 707/706 |
| 2013/0198376 | A1 | 8/2013 | Landa et al. |
| 2013/0332264 | A1 | 12/2013 | Chittilappilly et al. |
| 2014/0149333 | A1* | 5/2014 | Bennett ............... G06F 17/3089 706/46 |
| 2014/0149577 | A1* | 5/2014 | Monighetti ............ H04L 67/22 709/224 |
| 2016/0028839 | A1* | 1/2016 | Monighetti ............ H04L 67/22 709/224 |

FOREIGN PATENT DOCUMENTS

| | | |
|---|---|---|
| KR | 20060075696 | 7/2006 |
| WO | WO-2007021868 A2 | 2/2007 |
| WO | WO-2007/021868 A3 | 5/2009 |
| WO | WO-2009/064741 A1 | 5/2009 |
| WO | WO-2013112312 | 8/2013 |

OTHER PUBLICATIONS

USPTO, "U.S. Appl. No. 11/923,454, Non-Final Office Action dated Aug. 5, 2010", Aug. 5, 2010, 15 pages.

USPTO, "U.S. Appl. No. 11/923,470, Non-Final Office Action dated Aug. 28, 2009", Aug. 28, 2009, 7 pgs.

USPTO, "U.S. Appl. No. 11/923,506, Non-Final Office Action dated Aug. 25, 2009", Aug. 25, 2009, 15 Pgs.

USPTO, "U.S. Appl. No. 11/923,454, Final Office Action dated Aug. 19, 2009", Aug. 19, 2009, 12 Pgs.

USPTO, "U.S. Appl. No. 11/923,506, Non-Final Office Action dated Aug. 11, 2010", Aug. 11, 2010, 19 pgs.

USPTO, "U.S. Appl. No. 11/463,611, Non-Final Office Action dated Jun. 18, 2012", Jun. 18, 2012, 29 pages.

USPTO, "U.S. Appl. No. 11/923,454, Non-Final Office Action dated May 4, 2011", May 4, 2011, 13 pages.

USPTO, "U.S. Appl. No. 11/923,485, Final Office Action dated May 4, 2011", May 4, 2011, 11 pages.

USPTO, "U.S. Appl. No. 11/923,506, Non-Final Office Action dated May 3, 2011", May 3, 2011, 16 pages.

USPTO, "U.S. Appl. No. 11/938,710, Non-Final Office Action dated May 28, 2010", May 28, 2010, 9 pages.

USPTO, "U.S. Appl. No. 12/495,771, Notice of Allowance dated May 11, 2011", May 11, 2011, 10 pages.

USPTO, "U.S. Appl. No. 11/923,454, Non-Final Office Action dated Apr. 5, 2010", Apr. 5, 2010, 13 pages.

USPTO, "U.S. Appl. No. 11/923,486, Final Office Action dated Mar. 3, 2010", Mar. 3, 2010, 12 pages.

USPTO, "U.S. Appl. No. 11/938,716, Non-Final Office Action dated Mar. 12, 2009", Mar. 12, 2009, 6 pgs.

USPTO, "U.S. Appl. No. 11/923,506, Final Office Action dated Feb. 26, 2010", Feb. 26, 2010, 21 pages.

USPTO, "U.S. Appl. No. 11/923,470, Non-Final Office Action mailed Feb. 22, 2010", Feb. 22, 2010, 13 pages.

USPTO, "U.S. Appl. No. 11/938,710, Notice of Allowance dated Feb. 17, 2010", Feb. 17, 2010, 8 Pgs.

USPTO, "U.S. Appl. No. 12/495,771, Non-Final Office Action dated Dec. 2, 2010", Dec. 2, 2010, 11 pages.

USPTO, "U.S. Appl. No. 11/923,470 Final Office Action dated Oct. 28, 2010", Oct. 28, 2010, 15 pages.

USPTO, "U.S. Appl. No. 11/938,710, Notice of Allowance dated Oct. 15, 2010", Oct. 15, 2010, 9 pgs.

USPTO, "U.S. Appl. No. 11/923,454, Non-Final Office Action dated Jan. 8, 2009", Jan. 8, 2009, 7 pgs.

USPTO, "U.S. Appl. No. 11/923,485, Non-Final Office Action dated Jan. 6, 2011", Jan. 6, 2011, 14 pages.

USPTO, "U.S. Appl. No. 11/923,454, Final Office Action dated Jan. 6, 2011", Jan. 6, 2011, 15 pages.

USPTO, "U.S. Appl. No. 11/463,611, Final Office Action dated Jan. 19, 2011", Jan. 19, 2011, 17 pages.

USPTO, "U.S. Appl. No. 11/923,506, Final Office Action dated Jan. 12, 2011", Jan. 12, 2011, 19 pages.

USPTO, "U.S. Appl. No. 10/267,978. Final Office Action", Jan. 11, 2007, pp. 1-32.

USPTO, "U.S. Appl. No. 11/923,485, Non-Final Office Action dated Aug. 13, 2009", Aug. 13, 2009, 12 pgs.

Intl. Searching Authority, "International PCT Search Report", PCT No. PCT/US06/31259 dated Jul. 11, 2008, 10 pages.

International Search Authority, "International Application Serial No. PCT/US2008/083151, Search Report and Written Opinion dated Apr. 29, 2009", Apr. 29, 2009, 11 pages.

USPTO, "U.S. Appl. No. 13/359,901, Non-Final Office Action dated Apr. 10, 2012", Apr. 10, 2012, 21 pages.

USPTO, "U.S. Appl. No. 11/463,611, Non-Final Office Action dated Aug. 3, 2010", 17 pages.

USPTO, "U.S. Appl. No. 11/463,611, Non-Final Office Action dated Aug. 4, 2009", 16 pgs.

USPTO, "U.S. Appl. No. 11/463,611, Non-Final Office Action dated Jun. 23, 2008", 11 pgs.

USPTO, "U.S. Appl. No. 11/463,611, Final Office Action dated Mar. 19, 2009", 12 pgs.

USPTO, "U.S. Appl. No. 11/923,454, Non-Final Office Action dated Oct. 6, 2011", 13 Pages.

USPTO, "U.S. Appl. No. 11/923,470,Non-Final Office Action dated Dec. 9, 2011", 15 Pages.

USPTO, "U.S. Appl. No. 11/923,485, Non-Final Office Action dated Sep. 9, 2011", 11 Pgs.

USPTO, "U.S. Appl. No. 11/923,506, Non-Final Office Action dated Oct. 6, 2011", 14 pages.

USPTO, "U.S. Appl. No. 11/923,560, Non Final Office Action dated Oct. 28, 2009", 9 pages.

USPTO, "U.S. Appl. No. 11/923,608, Notice of Allowance dated Jul. 9, 2010", 11 pgs.

USPTO, "U.S. Appl. No. 11/923,609, Final Office Action dated Aug. 7, 2009", 11 Pgs.

USPTO, "U.S. Appl. No. 11/923,609 Non-Final Office Action dated Jan. 15, 2009", 7 Pgs.

USPTO, "U.S. Appl. No. 11/923,610, Non Final Office Action dated Sep. 2, 2009", 19 Pages.

USPTO, "U.S. Appl. No. 11/923,610, Notice of Allowance dated Apr. 29, 2010", 7 Pgs.

USPTO, "U.S. Appl. No. 11/923,617, Notice of Allowance dated Sep. 13, 2010", 7 pages.

USPTO, "U.S. Appl. No. 11/923,617, Non-Final Office Action dated Sep. 1, 2009", 11 Pgs.

USPTO, "U.S. Appl. No. 11/923,620, Non-Final Office Action dated Sep. 29, 2009", 19 Pgs.

(56) References Cited

OTHER PUBLICATIONS

USPTO, "U.S. Appl. No. 11/923,620, Notice of Allowance dated Jun. 27, 2011", 19 pages.
USPTO, "U.S. Appl. No. 11/923,621, Non-Final Office Action dated Sep. 30, 2009", 19 Pgs.
USPTO, "U.S. Appl. No. 11/923,624, Non- Final Office Action dated Sep. 29, 2009", 19 Pgs.
USPTO, "U.S. Appl. No. 11/923,624, Notice of Allowance dated Oct. 5, 2011", 23 pages.
USPTO, "U.S. Appl. No. 11/923,617, Notice of Allowance dated Mar. 23, 2010", 7 pages.
USPTO, "U.S. Appl. No. 13/150,370, Notice of Allowance dated Nov. 8, 2011", 22 Pgs.
USPTO, "U.S. Appl. No. 13/741,160, Notice of Allowance dated Oct. 7, 2014", 31 pages.
USPTO, "U.S. Appl. No. 11/923,609, Notice of Allowance dated Jan. 29, 2010", 14 Pgs.
USPTO, "U.S. Appl. No. 11/923,620, Final Office Action dated Apr. 23, 2010", 29 Pgs.
USPTO, "U.S. Appl. No. 11/923,621, Final Office Action dated Apr. 23, 2010", 29 Pages.
USPTO, "U.S. Appl. No. 11/923,621, Notice of Allowance dated Oct. 13, 2011", 23 pages.
USPTO, "U.S. Appl. No. 11/923,624, Final Office Action dated Apr. 23, 2010", 28 Pages.
International Search Authority, "International Application Serial No. PCT/US2013/21469, Search Report and Written Opinion dated Apr. 26, 2013", 6 pages.
WIPO, "International Application Serial No. PCT/US13/21469, Preliminary Report on Patentability dated May 14, 2015", 5 pages.

\* cited by examiner

DYNAMIC NORMALIZATION OF INTERNET TRAFFIC

CROSS-REFERENCE TO RELATED APPLICATIONS

This application claims the benefit of U.S. Pat. Appl. No. 61/929,290 filed Jan. 20, 2014, which is hereby incorporated by reference in its entirety.

This application is a continuation-in-part of the following U.S. patent applications, each of which is incorporated by reference in its entirety:

U.S. patent application Ser. No. 13/741,160 filed Jan. 14, 2013, which claims the benefit of U.S. Pat. Appl. No. 61/636,388 filed Apr. 20, 2012. U.S. patent application Ser. No. 13/741,160 is a continuation-in-part of U.S. patent application Ser. No. 13/359,901 filed Jan. 27, 2012, now U.S. Pat. No. 8,356,097 issued Jan. 15, 2013.

BACKGROUND

Field

This disclosure generally relates to methods and systems for normalizing web site traffic using a dynamic normalization technique.

Description of the Related Art

Determining methods and systems of collecting, structuring, aligning, analyzing, and presenting accurate estimates of internet activity is needed. A need exists for a system and method of internet traffic measurement that uses panel data and site-centric, or census, data.

SUMMARY

In an aspect, a method of estimating Internet traffic includes taking a size and demographic composition of a target population, identifying a group of participants within the target population that were active in a particular sub-period of a longer time period, determining demographic information for each active participant, receiving clickstream data at a host processing facility from the group of active participants that connotes Internet activity of individual members of the group of active participants, calculating an aggregate weight for the member by combining one or more weights across multiple sub-periods that the member is active to obtain an aggregate weight for the longer time period for the member, and producing, at the host processing facility, an estimate of a target population's Internet activity by scaling the data for each member of the group of participants to the relative size and demographic composition of the target population and the group of participants, wherein scaling comprises applying the calculated aggregate weight to the clickstream data in view of the demographic information. The method may include further scaling the data by applying a factor related to at least one of the size of the group of participants, a static value and a dynamic value. The static value may be at least one of hardcoded and based upon a heuristic. The dynamic value is calculated according to at least one of a formula, a function, and an algorithm. The method may further include refining the estimate of the target population's Internet activity by applying a bias adjustment to the estimate, wherein applying the bias adjustment to the estimate comprises applying a weight to a subset of the clickstream data from the group of participants. The bias adjustment may be at least one of a domain-specific, page-specific, segment-specific, and user-specific adjustment. The domain-specific bias may be a promotional bias. The promotional bias may occur when a source of clickstream data has a higher-than-relative growth in traffic when compared with other sources of clickstream data. The domain-specific bias may be a structural bias. The structural bias may occur when a web site is at least one of overrepresented and underrepresented due to the makeup of the sample population, wherein the domain-specific adjustment is a weight calculated using triangulation. The domain-specific bias may be determined by comparing a selection of the most trafficked domains for both penetration and period-to-period growth across all sources of clickstream data and determining that the sources of clickstream data disagree. The domain-specific bias may be determined by applying a rules-based process to a matrix of all data from all sources for a selection of domains. The method may further include applying an inflation adjustment to the scaling to account for a variation in the Internet behavior of the sample population. The variation may be due to at least one of attrition within the group of participants, variability of the estimated makeup of the target population, reformulation of the target population, and modification of a benchmark or other basis used to formulate or estimate the target population. The Internet activity may include a physical activity of the individual members of the group of participants, the physical activity selected from the group consisting of clicking, dwelling, and viewing. The size and demographic composition of at least one of the target population and the group of participants may be updated periodically. The demographic composition may group the population based on at least one of gender, age, income, and
geography. Members may be periodically removed from the group of participants, and wherein upon removing members from the group, adjusting the weight of the clickstream data from the remaining members. The time period may be a month and the sub-period may be a day.

In an aspect, a method of estimating Internet traffic may include taking a size and demographic composition of a target population, identifying a group of participants within the target population that were active on a particular sub-period of a longer time period, determining demographic information for each active participant, identifying one or more characteristics related to which it is desired to estimate Internet traffic, determining a fraction of the group of participants including users displaying the characteristic by analysis of a census-based measurement of internet traffic for at least one website, receiving clickstream data at a host processing facility from the fraction of the group of participants that connotes Internet activity of individual members of the fraction of the group of participants, calculating an aggregate weight for a member of the fraction of the group of participants by combining one or more weights across multiple sub-periods that the member is active to obtain an aggregate weight for the longer time period for the member, and producing, at the host processing facility, an estimate of a target population's Internet activity by scaling the data for each member of the fraction of the group of participants to the relative size and demographic composition of the target population and the group of participants, wherein scaling comprises applying the aggregate weight to the clickstream data in view of the demographic information. The method may further include refining the estimate of the target population's Internet activity by applying a global inflation factor to the estimate. One or more characteristics may relate to at least one of an internet browsing behavior, a demographic characteristic, and a geographic characteristic. The weight may be used to scale the clickstream data for the fraction of the group of participants with respect to a plurality of websites. The method may further include refining the estimate by iteratively applying a weight based on one or more of a demographic composition and a geographic composition of the target population to the estimate.

In an aspect, a method of estimating Internet traffic may include taking a size of a target population based on a published data source, identifying a fraction of participants within a clickstream panel that is managed by a party other than the publisher of the data source that were active in a predetermined time period, receiving clickstream data at a host processing facility from the clickstream panel that connotes Internet activity of the fraction of participants within the clickstream panel, and producing, at the host processing facility, an estimate of the target population's Internet activity by scaling the data for each member of the clickstream panel by a scaling factor that is based on the size of the target population relative to the fraction of the participants within the clickstream panel active during the predetermined time period. The method may further include refining the estimate of the target population's Internet activity by applying a bias adjustment to the estimate, wherein applying the bias adjustment to the estimate comprises adjusting the fraction active during the predetermined time period based on the predetermined time period being at least one of a holiday, a day of the week, a day in an identified season, and a time period that is subject to an identified exogenous effect. The bias adjustment may also include a structural bias adjustment. The structural bias may occur when a daily activity is at least one of overrepresented and underrepresented due to the makeup of the sample population, wherein the bias adjustment activity is calculated using generalized linear regression models. The Internet activity may include a physical activity of the individual members of the clickstream panel, the physical activity selected from the group consisting of clicking, dwelling, and viewing. The published data source may be at least one of census data and third party data. The exogenous effect may be at least one of a known weather event, a major news event, a major sporting event, an act of nature, and an act of war.

In an aspect, a method of estimating Internet traffic may include taking a size of a target population based on a published data source, identifying a percentage of the target population that displays an online behavior, receiving clickstream data at a host processing facility from a clickstream panel operated by a party other than the publisher of the published data source that connotes Internet activity of all members of the clickstream panel, identifying a fraction of members of the clickstream panel that exhibit the online behavior, calculating a scaling factor for the fraction of members of the clickstream panel by dividing the percentage of the target population that displays the online behavior by the fraction of members of the clickstream panel that exhibit the online behavior, and producing, at the host processing facility, an estimate of the target population's Internet activity by scaling clickstream data for members of the clickstream panel exhibiting the online behavior by the scaling factor and scaling the clickstream data for all members of the clickstream panel by a relative size of the target population. The online behavior may include at least one of a website visited, a URL visited, a category of websites/URLs visited, an activity engaged in online, a shopping behavior, an entertainment behavior, a news behavior, a reading behavior, a financial services behavior, an interaction with a bank or financial service provider, watching a show or movie, using a specific email provider, streaming music, conducting a search query, and an activity during a predetermined time period.

In an aspect, a method of estimating Internet traffic may include taking a size of a target population based on data from a published data source, taking a percentage of the target population that displays an online behavior based on the data to obtain a behavioral anchor, determining expected odds that a member of a clickstream panel operated by a party other than the publisher of the data source will exhibit the online behavior for a predetermined time period given the composition of the clickstream panel, receiving clickstream data at a host processing facility from a clickstream panel that connotes Internet activity of individual members of the clickstream panel, identifying an observed percentage of the clickstream panel that actually exhibited the online behavior and expressing this percentage as actual odds, calculating an odds ratio for observed behavior versus expected behavior, wherein the actual odds that the online behavior actually occurred during the predetermined time period is estimated to differ from the expected odds by a factor of the odds ratio, modifying the behavioral anchor by expressing the behavioral anchor as behavioral odds and multiplying the behavioral odds by the odds ratio to produce a dynamic behavioral anchor, and producing, at the host processing facility, an estimate of the target population's Internet activity by scaling the clickstream data for the participants in the clickstream panel exhibiting the online behavior so that it matches the dynamic behavioral anchor and scaling the clickstream data for all members of the clickstream panel by the relative size of the target population. The online behavior may be a website visited, a URL visited, a category of websites/URLs visited, an activity engaged in online, a shopping behavior, an entertainment behavior, a news behavior, a reading behavior, a financial services behavior, an interaction with bank or financial service provider, watching a show or movie, using a specific email provider, streaming music, conducting a search query, and an activity during a part of the day.

In an aspect, a method of estimating Internet traffic, taking a size of a target population based on a published data source, taking a number of devices in use by each member of the target population to access the internet, receiving clickstream data at a host processing facility from the clickstream panel that connotes Internet activity of members of the clickstream panel, calculating a device weighting factor for a clickstream by dividing the number of devices expected to be in use by each member of the target population by the number of devices that contributed to a user's clickstream, and producing, at the host processing facility, an estimate of the target population's Internet activity by scaling the clickstream data for each member of the clickstream panel by a scaling factor that is based on the size of the target population and the device weighting factor.

These and other systems, methods, objects, features, and advantages of the foregoing will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF FIGURES

The systems and methods described herein may be understood by reference to the following figures.

DETAILED DESCRIPTION OF FIGURES

Figure 1:
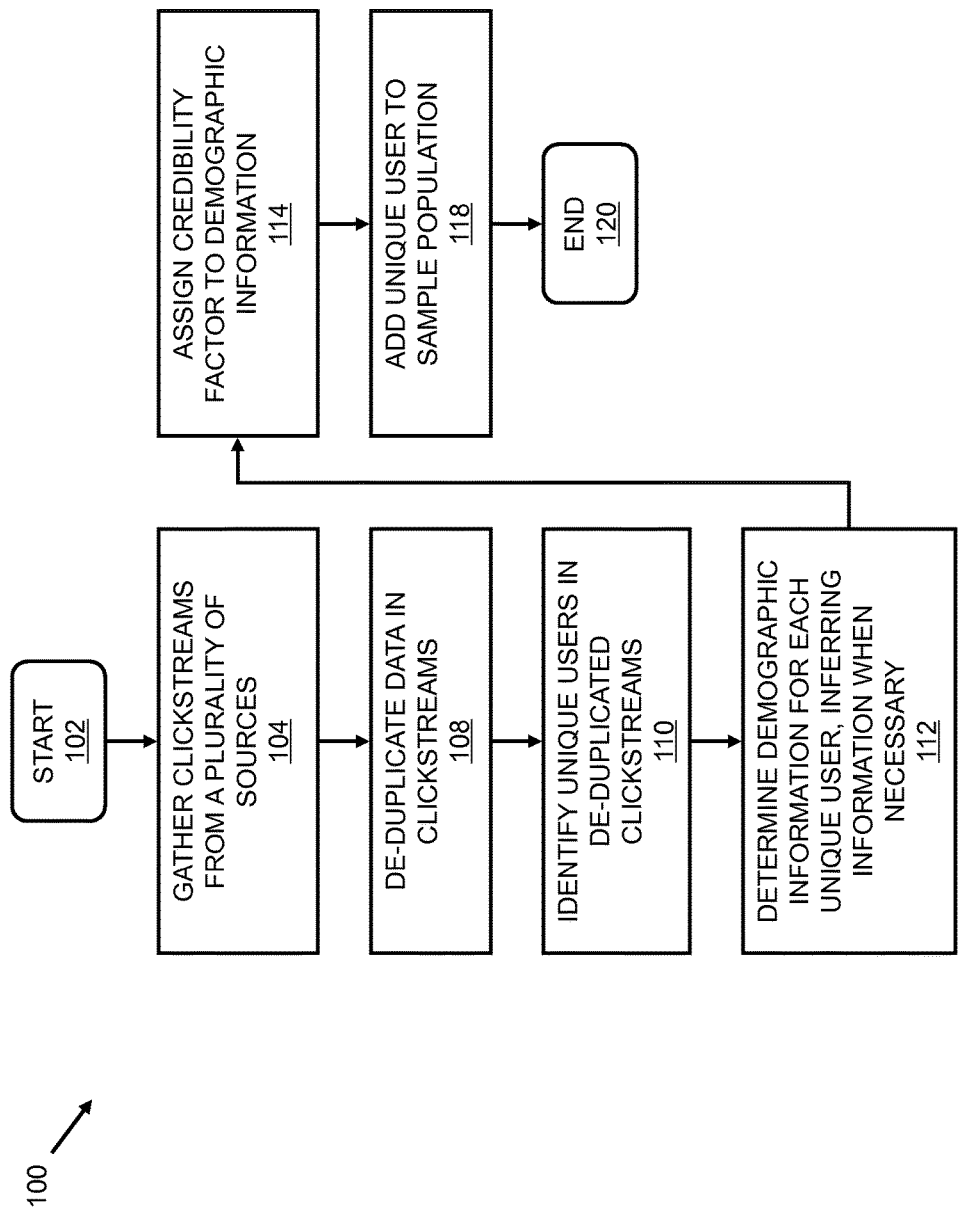
FIG. 1 depicts a flow chart of a process for determining a sample population.

Internet traffic may be estimated through methodologies that apply techniques of aggregation, transformation, and normalization from the fields of mathematics, statistics and the data sciences to enhance collected data. One of a plurality of sources of data for estimating internet traffic is a community of participants who contribute their internet activity. The community covers nearly every U.S. website available to the public. The statistics may ensure internet traffic estimates balance demographic and connection factors that match the entire U.S. Internet population. Internet traffic may be estimated by calculating the number of people in the U.S. that visit any given Web site over a period of time such as a calendar month. International internet traffic and usage calculations may be performed using similar methodologies. In an example, a web site profile may estimate how many people visit the site based on a sample of the participant community, wherein the sample is normalized to the size and demographic composition of the active U.S. Internet population. Although the U.S. internet population and U.S. web sites are used as examples in this disclosure, the methods and systems may be applied to all internet users and all web sites throughout the world and beyond.

Traffic estimated may be based on a definition of 'people' that is different compared to traffic reported through common local analytic solutions and traffic log analyzers. In an example, 'people' may include U.S. consumers, which means a consumer is counted only once no matter how often he or she visits a site throughout the course of an estimation period. In a comparative example, local analytic solutions may include domestic and international traffic and often include spiders and bots that appear as traffic, but do not represent actual human activity. Common sources of local analytic solutions may rely on log files or cookies which do not support distinguishing consumers to generate accurate estimates. Data sources such as spiders, bots, log files, agents, pingbacks, RSS update traffic, IP addresses, and the like may not be included in internet traffic estimates herein disclosed and used.

A metric associated with estimated internet traffic may be a count of people visiting a site, (e.g. People Count). People Count may be influenced by factors such as advertising. In an example, a site could drive up its People Count by buying a lot of advertising across the Internet. If users respond to the advertising by selecting a link that redirects them to the site, the people count may increase. Because People Count counts each person uniquely, the increased count could indicate the number of new visitors to the site during the current counting period (e.g. a month). However, many of these people may leave the site immediately; such as if they find the site does not meet their current preferences or needs. Therefore, while people counts is a valuable metric, other metrics may provide an understanding of how people respond to the site once they have selected it, such as in an internet advertisement in this example. A type of metric that may provide an understanding of a user's engagement with a web site may include aspects such as an amount of time a user stays connected to the site or how many pages the user looks at.

People count may be calculated as a count of unique visitors (people) to a website over a predetermined period of time. A default period of time may be a calendar month. People count may be calculated for a plurality of periods of time so that each period of time may be available for use and presentation to a user. People count may be calculated for a plurality of web sites over the plurality of periods of time so that the people counts for each of the web sites in each of the periods of time may be available for use and presentation to a user. In an example, a user may identify three websites for which the user would like to view a people count metric for each of the last 13 months. A data store of information collected and analyzed as described herein and in any referenced documents may be accessed to compute a monthly people count metric for each of the three identified websites. The resulting calculations may be stored in a file, data store, or other memory so that they can be presented to the user. The stored people count metrics may be presented as a table, a line graph, a bar graph, a series of pie charts, and any other text based or graph based output. In addition to being able to generate three different people counts for three different web sites, people counts, and other metrics herein described can be generated as an aggregated people count for a category of web sites, businesses, domains, blogs, and the like (e.g. Book Sellers). An individual user who may visit multiple sites in a category may be counted as only one user for the category so that people counts within a category reflect the same type of count as people counts for a web site. Without identifying the user uniquely, this may be impossible to do accurately.

People count may be associated with other metrics related to websites, such as traffic rank and visits. People count may also be beneficial in calculating an internet traffic rank of a website (e.g. a Rank metric) by comparing the people count over a period of time for a number of web sites. The web sites may be sorted based on their people count and presented in an order, such as highest people count to lowest people count. The web sites may include any subset of internet websites, such as US web sites, news websites, shopping web sites, patent law related web sites, government web sites, and any other grouping or category that may be established based on aspects of web sites. In an example, a ranking of US websites may include any type of website that is hosted in the US. In the example, people count for the US websites may be accumulated over a period of one month. The web site with the highest people count over the month would rank first, the web site with the next highest people count would rank second, and so forth.

People count may also be beneficial in calculating a visit metric (Visits). Because people count is determined based on a specific individual access to a website, each visit by a specific individual may be counted. Additionally, a time between interactions with a website during a visit may be measured and used to determine a visit metric. Because both information on a website is dynamic, and user activity associated with the internet may be interrupted by activity unrelated to the internet (e.g. meetings, phone calls, offline research, and the like), it may be beneficial to account for and assess the impact of these interruptions. Therefore a visit metric may count two web site interactions by a specific individual as two visits if the interaction is separated by a minimum amount of time. In this way, even if a user opens and first interacts with a web site in a web browser but does not have a second interaction with the open website again for a minimum amount of time, each of the first and second interactions may be counted as visits in a visit metric. The minimum amount of time may be predetermined (e.g. 30 minutes), may be selectable (e.g. by a user or administrator), may be adaptable based on user activity history (e.g. a single user, all users in a community, and the like), or may be based on the website (e.g. interactions with a shopping web site in which the second interaction is only to checkout of a shopping cart that was filled in the first interaction may not be counted as a second visit).

Normalization of clickstream data sources may be beneficial in that biases in data sources may be accounted for; attrition and turnover of individuals providing clickstream data may be adjusted for; data sources with narrow demographics may be used without the narrow demographics causing the combined clickstream data to misrepresent a general internet browsing population. In as much as a general internet browsing population includes a wide variance in users, normalization of clickstream data from various sources may facilitate scaling the data to reflect the general internet browsing population. Normalization of clickstream data and associated demographics and the like may also allow significantly different data sources, each possibly containing biases or lacking demographics, to be used in the methods and systems herein described to provide useful and beneficial analysis of clickstream data that may be representative of a general internet browsing population.

FIG. 1 depicts a flow chart of a process 100 for determining a sample population or a selected panel of users to use in clickstream analysis and reporting as herein described. The sample population may comprise unique users with known or inferred demographic information. The process 100 for determining the sample population may begin at logical block 302. Processing flow may continue to logical block 104 where the process gathers clickstreams from a plurality of sources. The clickstream samples may be more or less comprehensive and may correspond to a particular time period. In embodiments, the time period may be a day, week, month, and so on. In embodiments, the clickstream data may be gathered from an Internet Service Provider (ISP), an Application Service Provider (ASP), a proprietary or third-party panel, and so on. In embodiments, the proprietary or third-party panel may comprise a set of users who use web browsers that provide a clickstream capture facility such as and without limitation a data collection server. The click stream capture facility may record a user's clickstream in real time and then transmit the clickstream to a facility that gathers such clickstream. In embodiments, this transmitting may occur in real time or from time to time.

Figure 3:
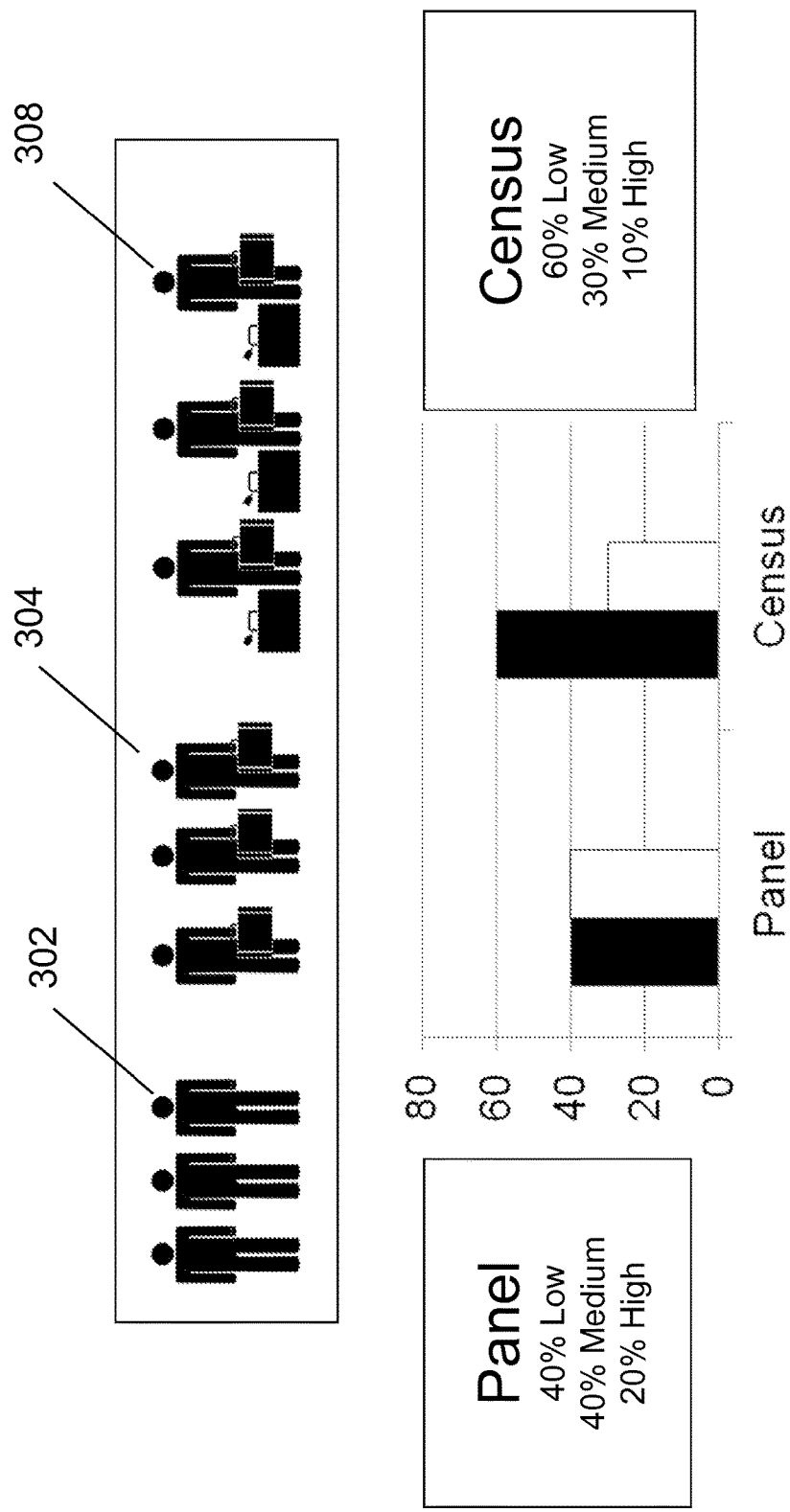
FIG. 3 depicts a flow diagram of a hybrid method for internet traffic measurement.
Figure 5:
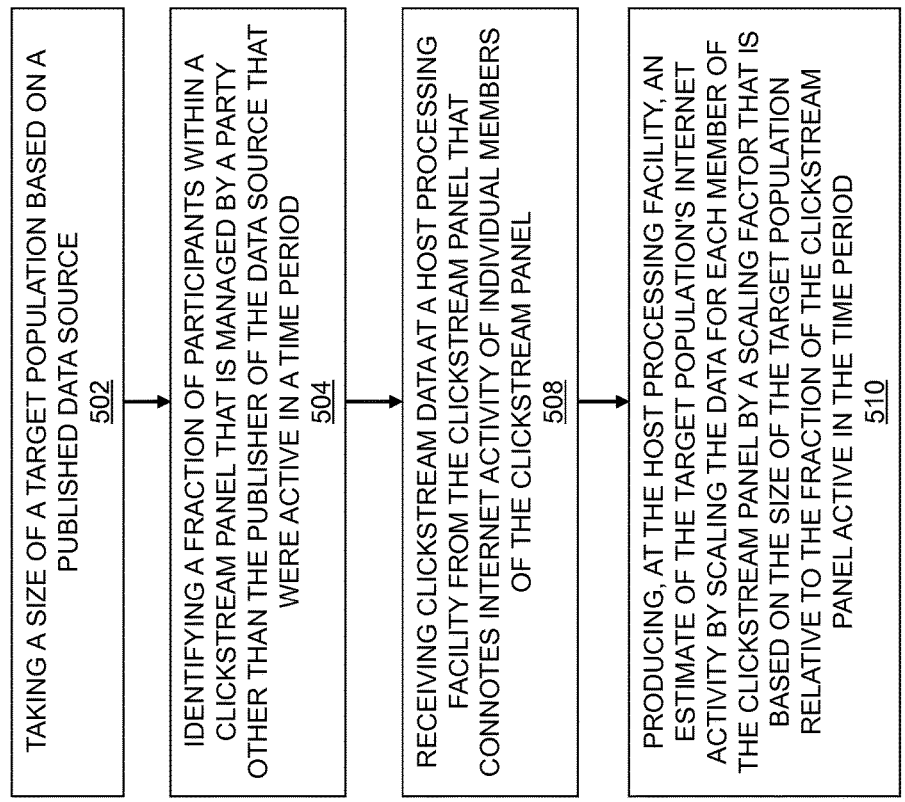
FIG. 5 depicts a flow chart of generating a daily IBP model.
Figure 6:
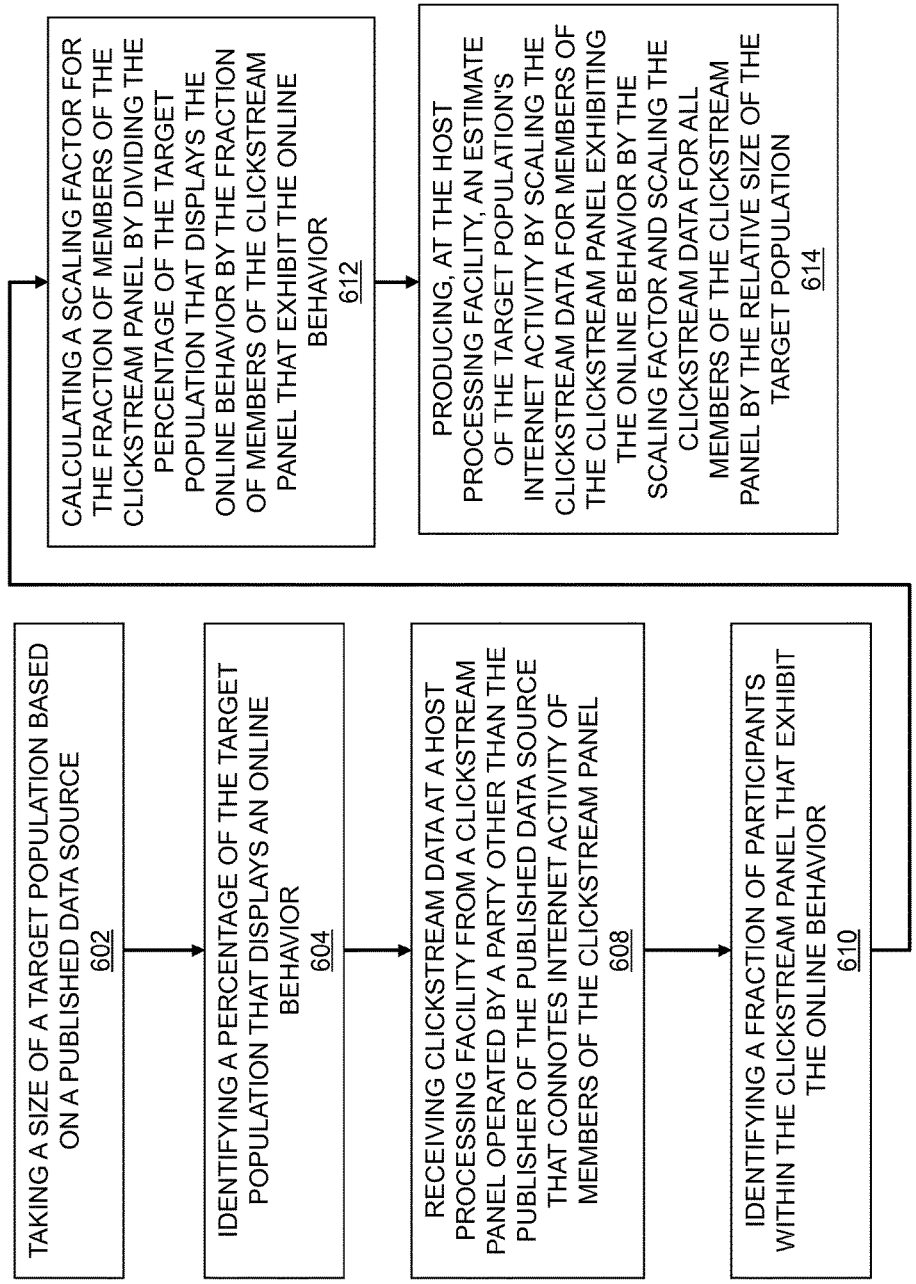
FIG. 6 depicts a flow chart of a dynamic normalization process including generating a static behavioral anchor.
Figure 7:
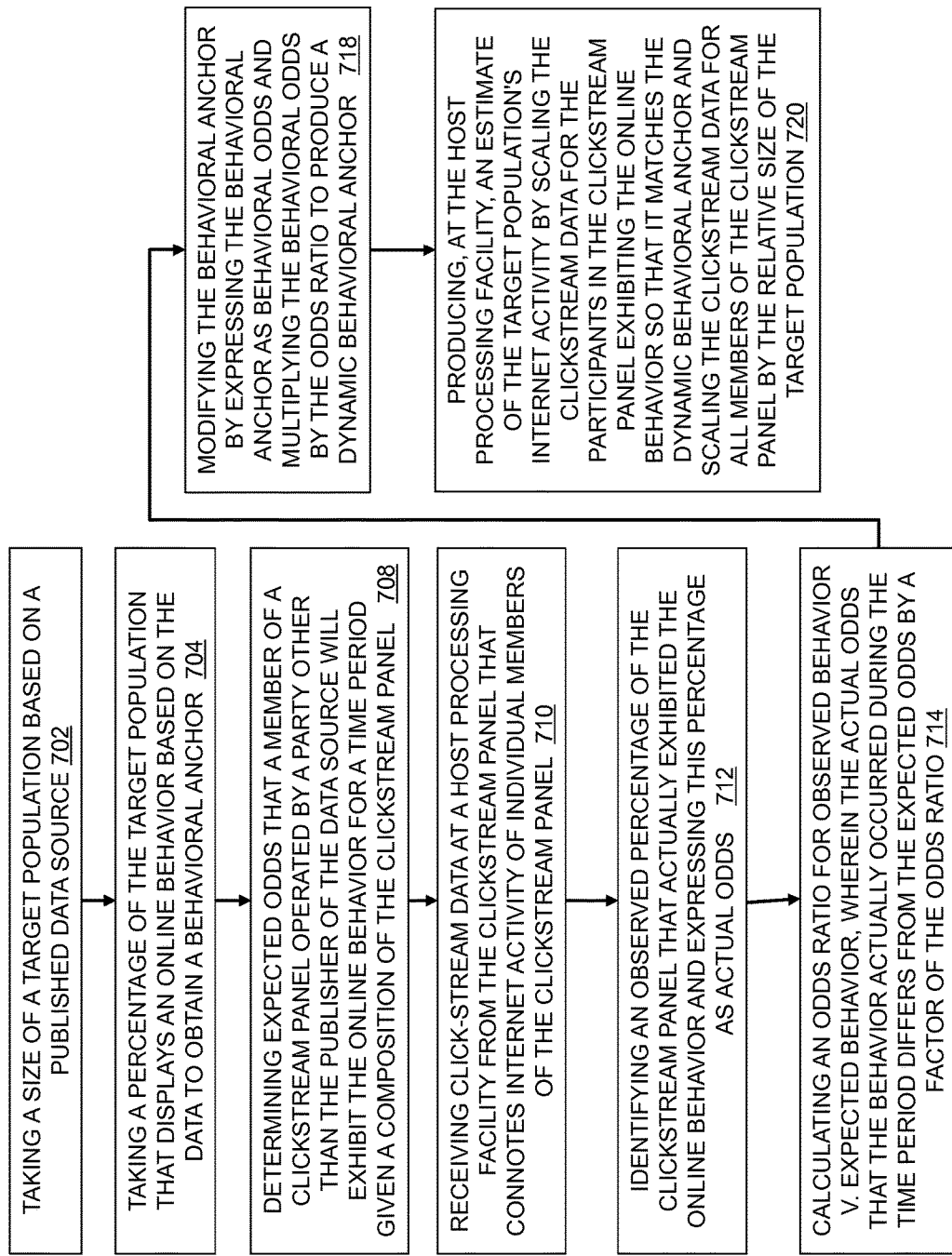
FIG. 7 depicts a a flow chart of a dynamic normalization process including generating a dynamic behavioral anchor.
Figure 8:
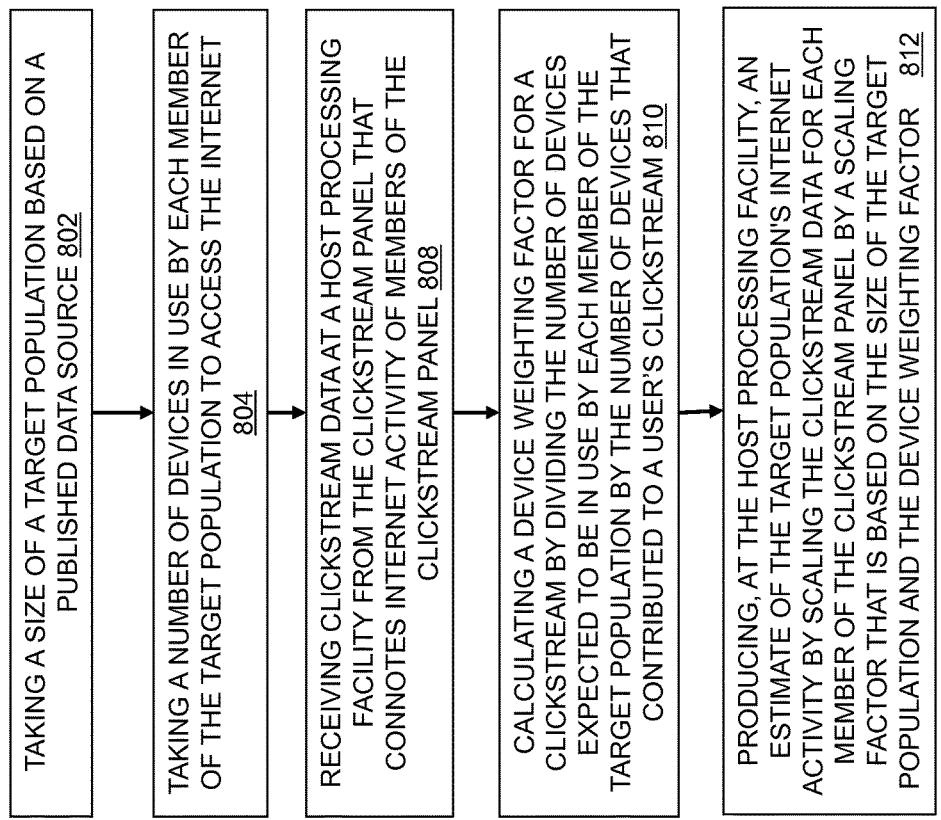
FIG. 8 depicts a a flow chart of a dynamic normalization process including generating a device weighting factor.

It will be appreciated that an embodiment of gathering clickstreams from a plurality of sources may be described in FIG. 3 of U.S. patent application Ser. No. 10/267,978 entitled "Clickstream Analysis Methods And Systems" ("the related application"), which is hereby incorporated by reference in its entirety. Moreover, it will be appreciated that FIG. 4 of the related application may disclose an embodiment of a process for gathering clickstreams from a plurality of sources. It will also be appreciated that, in embodiments, gathering clickstreams from a plurality of sources may involve converting files from a plurality of data providers into a common file format, as is disclosed at a high level in step 502 of FIG. 5 of the related application and as is disclosed in detail in flow diagram 600 of FIG. 6 of the related application. It will further be appreciated that a file cleansing process—such as that disclosed by element 800 of FIG. 8 of the related application—may be applied to files from the plurality of data providers and/or files in the common file format.

Next, processing flow may continue to logical block 108 where the process 100 for determining the sample population may de-duplicate data in the clickstream. It will be appreciated that de-duplication of data in the clickstream may be disclosed in step 322 of FIG. 3 of the related application.

Continuing from logical block 108 to logical block 110, the process 100 may identify unique users whose Internet behavior is captured in the clickstream. Following that, the process 100 may continue to logical block 212 where it determines demographic information for each unique user. The demographic information may include age, income, gender, zip code, any and all combinations of the foregoing, and so on. If will be appreciated that such determining of demographic information may be an example of what is contemplated by step 320 of FIG. 3 of the related application.

In some cases, the demographic information may simply be known. For example and without limitation, an ISP that provides the clickstream data may also provide the demographic information for the unique users whose actions are captured in the clickstream. For another example and also without limitation, a user may provide the demographic information as part of a process for installing the clickstream capture facility into his web browser. In cases like these, a lookup may determine the demographic information for a unique user.

In other cases, however, some or all of the demographic information for a unique user may not be known. The process 100 for determining the sample population may attempt to infer the otherwise unknown demographic information. Such an inference may be drawn by applying an algorithm, a heuristic, a plurality of any one of the foregoing, any and all combinations of the foregoing, or the like to inputs that relate to the unique user. The inputs may, without limitation, include clickstream data, demographic data reported by a third party, demographic data inferred by a third party, so-called geo-IP data (that is, data from an IP-address-to-zip-code conversion process), and so on. In embodiments, the algorithm may be a supervised-learning algorithm such as and without limitation a Classification And Regression Tree (CART). In any case, when drawing the inference using a combination or plurality of algorithms and/or heuristics, one element of the combination or plurality may provide an inference that is later overridden by another element of the combination or plurality. The inference may at least in part be based upon webpage or website access patterns, domain or sub-domain access patterns, penetration into informational categories, an IP address, a zip code, and the like.

In embodiments, a rules-based heuristic may, on a case-by-case basis, override a CART's inference. For example and without limitation, the CART may infer that a unique user who accesses a certain category of information address is male. However experience may show that, for whatever reason, users who access that category of information are almost always female. The rules-based heuristic may be coded to override the CART's inference when the CART infers that the unique user is male and the unique user is known to access that category of information. Many other such embodiments will be appreciated and all are within the scope of the present disclosure.

In embodiments, the inference may contain default or random information—especially in cases where a more enlightened inference is unavailable or when a plurality of inferences conflict to such a degree that it cannot be determined with an acceptable degree of certainty which one of the conflicting inferences is most likely to be accurate.

At some point, the process 100 for determining the sample population may continue to logical block 114 where it assigns a credibility factor to the demographic information. This factor may relate to a statistical level of confidence in a unique user's demographic information. This statistical level of confidence may be used in computations associated with the unique user's demographic information. Thus, the normalization process may be able to scale Internet-behavior statistics of the sample population in a more accurate manner when taking the credibility factor into account. Credibility factors may be applied to unique users, clickstream sources, groups of users within a sample population, and the like. Computations, calculations, analysis, and processing of information to which one or more credibility factors have been applied maybe affected by the credibility factor so that a desired treatment of the information can be achieved algorithmically.

Next, the process 100 continues to logical block 118 where it adds the unique user to the sample population, creating a new panel user. An embodiment of adding unique users to a sample population may be disclosed in steps 920 through 928 of FIG. 9 of the related application. In embodiments, adding the unique user to the sample population may involve a statistical process that is described in paragraph [0065] of the related application. Finally, the process 100 for determining the sample population ends at logical block 120. In an example, a sample population may include users who are unique, active in the current sample period, and have demographics. Additionally, the sample population may be restricted to users who also were active in the prior sample period.

Figure 2:
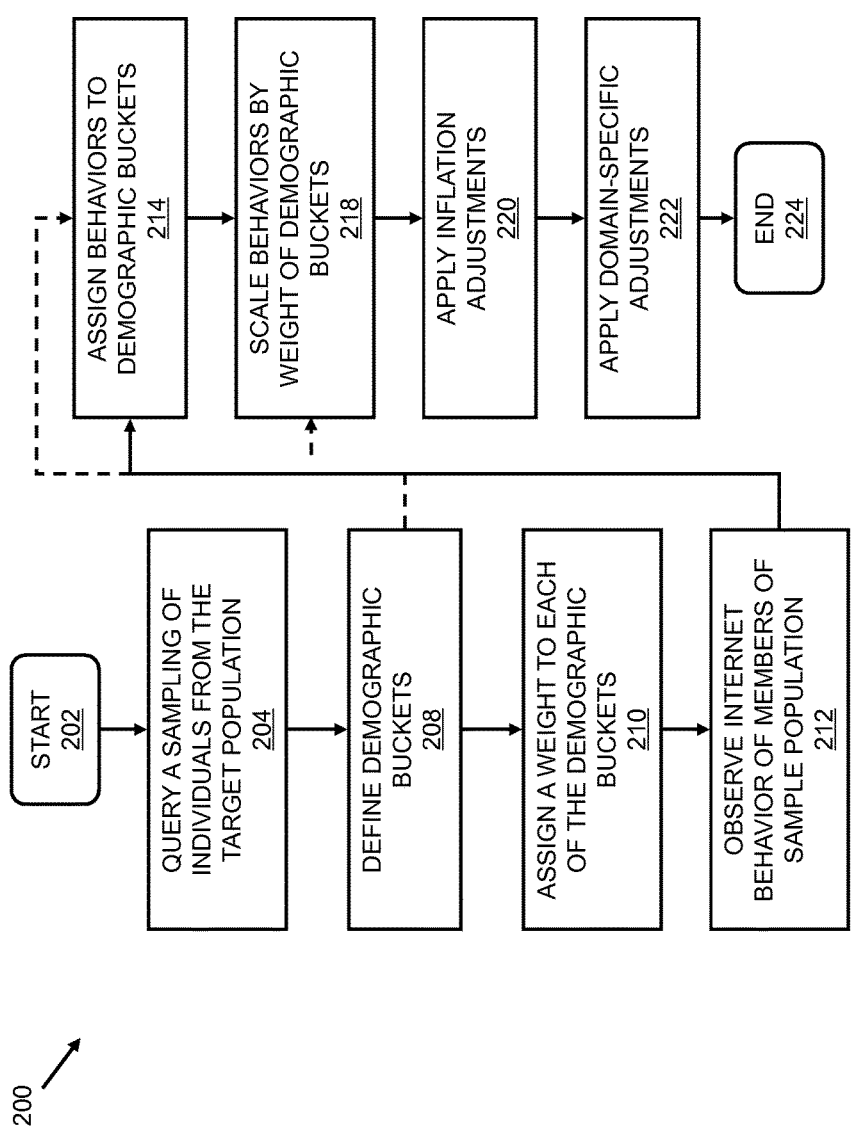
FIG. 2 depicts a flow chart of a normalization process.

Having determined the new panel sample population and its demographics, it may be possible to estimate the Internet-behavior statistics or metrics of any and all target populations by applying a normalization process to the Internet-behavior statistics or metrics of the sample population. FIG. 2 depicts a flow chart for such a normalization process 200, which scales Internet-behavior statistics or metrics of a sample population so that the Internet-behavior statistics or metrics reflect a different target population. The target population may or may not be larger and more general than the sample population. For example and without limitation, the target population may comprise the U.S. Internet user population (also referred to herein and elsewhere as the Internet Browser Population or IBP) and the sample population may comprise a relatively small panel of Internet users. The Internet-behavior statistics or metrics may, without limitation, include or relate to unique users, page views, search terms, session conversions for specific sites (wherein a site may comprise a URL, domain, sub-domain, or the like), a trajectory across or including several sites (for example and without limitation homepage click-through behavior), any and all of the metrics described herein and elsewhere, any and all combinations of the foregoing, and so on. The Internet-behavior statistics may be drawn from clickstream samples. The clickstream samples may originate from direct observation and/or probability-based sampling. The target population may be circumscribed by geographic extent (for example and without limitation, America, North America, Global, and so on); Internet usage (for example and without limitation, web browsing, email access, all Internet access, and so on); and the like.

Without limitation, scaling Internet-behavior statistics may be done on the basis of total sample size and/or on the basis of demographic-specific weights. The demographic-specific weights may be chosen in such a way the scaling produces Internet-behavior statistics that mirror, in a statistically significant way, actual Internet-behavior statistics of the target population. In other words, with the proper demographic-specific weights, one may project or estimate the actual Internet-behavior statistics of a target population based upon the Internet-behavior statistics of the sample population.

In embodiments, both the sample population and the target population may comprise dial-up Internet users and broadband Internet users in various proportions. The proportion of dial-up users to broadband users for the sample population may differ from the proportion of dial-up users to broadband users for the target population. One or more forms of scaling or adjustment may be applied to the clickstream samples to account for such a difference. These forms of scaling of adjustment may include static or dynamic values that change over time. The static values may be hardcoded and/or based upon a heuristic. The dynamic values may be calculated according to a formula, function, algorithm, or the like.

The process 200 starts at logical block 302 and continues to logical block 204 where it queries a more or less random sampling of individuals from the target population. This querying may determine various facts about the individuals including without limitation their demographics, their Internet use in the previous 30 days, their children's Internet use in the previous 30 days (if applicable), and so on. Based upon both these facts and perhaps other facts about the target population at large, it may be possible to estimate the size and demographic makeup of the target population. It will be appreciated that an embodiment of such querying may be disclosed in step 908 of FIG. 9 of the related application.

In any case, processing flow may continue to logical block 208 where a number of demographic buckets are defined. Each bucket may correspond to a unique range of ages, genders, and household incomes. Some or all of these ranges may relate to the facts about the sampling of individuals from the target population. Moreover, some or all of these ranges may relate to facts about individuals that can be determined or inferred from clickstream data. Such facts may, without limitation, relate to age, gender, household income, education, employment, census division, metropolitan status, and so on.

Now that the size and demographic makeup of the target population has been estimated, it may be possible to determine how many members of the target population that each member of the sample population represents. Processing flow continues to logical block 210 where this determination may be made and then encoded as a weight that is assigned to a demographic bucket. This weight may be the estimated target population of the bucket divided by the number of members in the sample population in the bucket.

As the Internet behaviors of a member of the sample population are observed (logical block 212), these behaviors may be assigned to the demographic bucket of the member (logical block 214) and scaled by the weight of the bucket (logical block 218) to form an estimate of the Internet behaviors of the target population. For example and without limitation, a demographic bucket may correspond to 18-25 year-old males. The weight of this bucket may be 348. A member of the sample population may be a 19 year-old male. Clickstream data from this member may indicate an Internet behavior that is visiting a first website and then visiting a second website. This behavior may be assigned to the aforementioned demographic bucket and scaled by the weight of the bucket. As a result, the estimated Internet behavior of the target population includes 348 instances of 18-25 year-old males visiting the first website and then the second website. Many other such examples will be appreciated and all such examples are within the scope of the present disclosure.

The estimate of the Internet behaviors of the target population may be further refined through the application of inflation adjustments (logical block 220). These inflation adjustments may account for periodic or occasional variations in the Internet behavior of the sample population and/or the estimated makeup of the target population. These variations may be due to attrition within the sample population, variability of the estimated makeup of the target population, reformulation of the sample population, modification of a benchmark or other basis used to formulate or estimate the sample population and/or the target population, and so on. In any case, the inflation adjustments may be encoded in a weight that is referred to herein and elsewhere as a Global Inflation Factor or GIF. So, observed Internet behaviors of a member of the sample population may be assigned to a demographic bucket and then scaled by both the weight of that bucket and the GIF. This may produce a more accurate estimate of the target population's Internet behavior than would result from applying the bucket's weight alone.

The estimate of the Internet behaviors of the target population may be further refined through the application of domain-specific adjustments (logical block 222), which may be referred to herein and elsewhere as Domain Specific Normalization, Diverse Source Normalization, or DSN. These adjustments may take into account data from a plurality of sources to compensate for domain-specific biases such promotional bias, structural bias, and so on. In embodiments, an adjustment of this type may comprise a weight. In embodiments, these weights may be calculated using triangulation.

Structural bias may occur when a site is overrepresented or underrepresented due to the makeup of the sample population. For example and without limitation, in a sample population consisting only of dial-up Internet users, graphic-intensive sites may tend to be underrepresented because the members of the sample group may experience significant delays in accessing the sites. For another example and also without limitation, in a sample population containing a relatively high proportion of sophisticated Internet users, sites that cater to sophisticated Internet users may be overrepresented. Sites that cater to sophisticated Internet users may include sites that require high bandwidth connections, such as streaming video sites.

Promotional bias may occur when a source of clickstream data has a higher-than-relative growth in traffic when compared with other sources of clickstream data. Such spikes in clickstream data may be due to promotions and sometimes need to be mitigated lest they result in overstating the Internet behavior of the population at large, such as the target population.

Following the application of domain-specific adjustments the process 200 may end at logical block 224.

In embodiments, one may determine the presence of structural or promotional bias by comparing a selection of the most trafficked domains for both penetration and period-to-period growth across all sources of clickstream data. When the sources of clickstream data do not agree, then a bias may be present in the clickstream data. Alternatively or additionally, a matrix of all data from all sources for a selection of domains may be run through a number of rules for indicating different biases. In any case, an automatic process for determining the presence of a bias may produce a report that can be reviewed manually. The report may contain domain information, category information, a description of the bias, data that supports the bias, and so on.

In embodiments, processes 100 and 200 may be alternatively connected so that different paths through the connected processes are possible. Logical block 214 may directly connect to logical block 302 or to logical block 208 based, for example, on availability of relevant data from a target population.

In embodiments, process 200 may include alternative flows among the logical blocks to facilitate alternative or optional processes. In an example, determining a behavior, such as visiting a domain, could follow a process that may not include logical blocks 210 and 212. In another alternative flow, behaviors may be pre-assigned to demographic buckets so a flow may omit logical step 214. In a more general embodiment, each logical block in the flows represents logical operations that may be applied to the various data to which the processes herein are applied. If in a given embodiment, a logical block is not required to produce the desired outcome, the logical block may be bypassed or it may simply propagate the data to another logical block.

In embodiments, a volume metric of Internet behavior (such as page views, uniques, visits, and so on) may be calculated with respect to a demographic bucket according to the following equation: samples from sample population*weight*GIF* DSN=estimated samples of target population. For example, if the clickstream data from all sources indicates 100 page views at www.domain.com by 18-25 year-old males in the sample population and the weight of the 18-25 year-old male demographic bucket is 10 and the GIF is 5 and the DSN for www.domain.com is 2 then the estimated number of page views by 18-25 year-old males in the target population is 10,000.

In some embodiments, the clickstream data source that is to normalized is derived from users of a panel whose clickstream data are collected using a data collection agent, or DCA. The DCA is further described in co-owned US 20070055937. Multiple users of the DCA may make up a DCA panel. The DCA panel may be used to collect data regarding specific internet traffic.

In some embodiments, data collected by the DCA may be used to determine a user's web browsing behavior and patterns across many different websites, whether or not traffic at those websites is monitored independently. Web browsing behavior for a panel of users of the DCA (DCA panel) may be determined using data collected from the panel by each DCA used by the panelist. In some embodiments, the panel data may be used to estimate the web browsing behavior of the internet population in general. For example, one metric may simply be internet traffic at a particular website. In the example, data from a panel of users may be weighted to determine or estimate actual traffic levels for all internet users. For example in the United States, there is an estimated total internet audience of 310 million. Weighting involves determining the percentage of the population represented by the panel and using that representation, or weighting factor, in further calculations. For example, all unique visitor numbers for sites or page impressions in the panel data may be multiplied or weighted by the weighting factor in order to estimate the actual traffic levels.

A hybrid measurement approach involves combining panel data with site-centric, or census-based, measurements. Site-centric measurement means directly measuring traffic at a particular website utilizing software or code adapted to make such a measurement or by gathering data from a server dump. In embodiments, any census-based approach may be used to obtain data regarding internet traffic at a particular website or domain. Panel data involves collecting internet behavior data for individual users across a number of websites and domains. Panel data for a particular website may be scaled up and compared to site-centric data for that particular website, such as to, for example, confirm the reliability of the panel approach. One way to scale up the data involves simply scaling the panel data to the overall population of a group of internet users. For example, of 10,000 users who are taking part in the panel, say 2000 users visit a monitored web site (resource) or perform particular interactions on that web site which has corresponding site centric measurements output available.

The 2000 DCA panelists who have accessed the web site that is monitored are scaled up in accordance with a target population, such as the internet browser population, to determine a number that represents the number of visitors estimated to have actually visited that site. This results in an expected 62 million users in the internet population to visit this site over the predefined period. There is an expectation that the numbers obtained, after scaling up, and the actual site-centric measurements should have some degree of correspondence.

This approach cannot provide insight into whether or not the internet browsing behavior of people in the panel is representative of the population to which the panel data are being scaled. Simple scaling blurs the line between potential sub-populations of visitors to a website.

In order to effectively use panel data to estimate all traffic to a website or specific domain for a sub-population, additional steps need to be taken. The population that the panel data are being scaled against needs to be divided into sub-populations by characteristic, behavioral trait, or demographic strata. Demographic strata may be generated by defining sub-populations of panelists according to age, gender, income, and the like. Then, each stratum is defined by a combination of one or more of the sub-populations. For example, a stratum can include one or more sub-populations from each of the age, gender or income groups. It should be understood that any demographic characteristic may be used to define a sub-population, such as race, ethnicity, citizenship, location, marital status, languages, disabilities, mobility, home ownership, sexuality, employment status, and the like.

One or more characteristics related to which it is desired to estimate Internet traffic may be identified. For example, a behavioral trait may be frequency of visits to travel-related domains, such as high frequency visitors, medium frequency visitors, and low or no frequency visitors. Since census-based data may not be available for all travel-related domains and thus the absolute population of visitors to travel-related domains cannot be known, the sub-populations can be described in terms of a percentage of the known, census-based population. Thus, a fraction of a target population including users displaying the characteristic may be determined by analysis of a census-based measurement of all of the internet traffic for at least one website. Census data can be used to understand and identify one or more characteristics or behavioral traits about individuals, but the data should first be attributed to an individual. One example of this attribution is by examining cookies or other information about the machine used to access the webpage and use the information as proxy for a person. Then, behavioral traits may be identified by analysis of the attributed data. For example, FIG. 3 depicts the population of users who visit travel-related domains. The population can be divided into low frequency visitors 302, medium frequency visitors 304, and high frequency visitors 308. Based on census data for traffic to travel-related domains, the low frequency visitors 302 account for 60% of the traffic, medium frequency visitors 304 account for 30% of the traffic, and high frequency visitors 308 account for 10% of the traffic.

Clickstream data, such as clickstream data from the DCA panel, may be received at a host processing facility from a group of participants comprising a panel. The clickstream data connotes Internet activity of individual members of the panel, the Internet activity relating to at least one website. Analysis of the panel data may be used to identify a fraction of the panelists that share the one or more characteristics or behavioral traits identified in the census population. For example, FIG. 3 depicts the same breakdown of internet traffic for travel-related domains by frequency for panelists. Based on panel data for traffic to travel-related domains, the low frequency visitors 302 account for 40% of the traffic, medium frequency visitors 304 account for 40% of the traffic, and high frequency visitors 308 account for 20% of the traffic.

Determining a behavioral composition may involve scaling the fraction of the panelists by the fraction of the target population. For example, in the scenario depicted in FIG. 3, the panel data suggests that 20% of the internet traffic to travel-related domains is from visitors who visit the domains with high frequency. However, it is known from the panel data that the general population of travel-related domain visitors comprises only 10% of high frequency visitors. Thus, in order to scale up the panel data for the high frequency visitors, the weight of their panel data needs to be halved. Then, an estimate of the target population's activity with respect to the travel-related domains may be obtained by scaling the clickstream data for the subset of the panel, in this case the high frequency visitors, by applying a weight based on the behavioral composition and the relative size of the target population. For example, the total number of visitors to travel-related domains may be 25 million and the total number of panelists may be 10,000. If the medium frequency visitor panel data were scaled only to the relative size of the target population, the calculation would simply involve multiplying 25 million by 40% to obtain 10 million. However, because it is known that the medium frequency behavior is actually over-represented in the panel data (40% in the panel versus 30% in the census), the panel data should be weighted to account for this difference. In this case, the weighting is ¾, so the final number for the estimate of medium frequency visitors to travel-related domains is 7.5 million.

In other examples, scaling may be done according the demographic strata, as described above. In order to scale up panel data to a target population, weighting may take into account the proportion of panelists who fall within certain demographic strata.

It should be understood that the weight may be used to scale the clickstream data for the subset of the panel with respect to one website, a plurality of websites, one domain, or a plurality of domains.

Refining the estimate of the target population's Internet activity may be done by applying a global inflation factor (GIF) to the estimate, as discussed previously herein.

The one or more characteristics or behavioral traits may relate to at least one of an internet browsing behavior (also known as a behavioral trait or a characteristic), a demographic characteristic, and a geographic characteristic. For example, the demographic characteristic may be age, income, gender, race, and the like.

Refining the estimate may be done by iteratively applying a weight based on one or more of a demographic composition and a geographic composition of the target population to the estimate.

In an embodiment, inherent in the sampling there may be deviations and therefore a calibration in terms of an error rate is introduced, being the ratio of the site-centric measurements to that of a calibration panel.

In embodiments, the calibration panel may be separate from the DCA panel in that none of the DCA panelists are members of the calibration panel. Continuing with the above example, the calibration panel may be 1000 total calibration panelists. Of these 1000 calibration panelists, 200 visit the site that is monitored. Scaled up, this suggests that 62,000,000 users in the general internet audience would visit the site. Thus, if the actual census data for the number of visits to the monitored web site is 63,000,000, then the actual deviation provides a ratio of 1.016 so that the sample has an error rate of a factor of 0.016. Continuing with the above example, if another 2500 panellists visit a web site that is not monitored and where no site-centric measurement data are available, to estimate the total traffic or users that would access the other web site, the panel data are scaled up similarly to arrive at 77.5 million visits. The ratio of 1.016 is then multiplied by the figure derived above from DCA panelists visiting an unmonitored site (77.5 million) to obtain a corrected value of 78.74 million visits.

Similar or other techniques can be applied on a group of resources, such as a number of web sites or advertising page impressions. Furthermore different metrics, based on different requirements may need alternative calibrations, such metrics including page impressions, unique visitors or time measurement. The calibration may be based on two data sources or more than two data sources, whether they be from monitored or unmonitored resources. Alternatively, the error rate may be based on third party data.

In an alternative embodiment, a separate set of monitored resources just for the error rate creation may be used. In this embodiment, the 2,000 DCA panelists who have accessed monitored resources are scaled up in accordance with the internet to determine a number that represents the number of visitors estimated to have actually visited that site, which is 62 million users. To adjust this estimation for error, the DCA panel is monitored at a second set of monitored resources for which census data exists. The process for generating and applying the error rate follows the process outlined above, however, the principal difference is that no census data is used in conjunction with the main set of monitored resources.

Thus, by using the above methods, sites that are not monitored can have additional data available to them to estimate the amount of traffic, which provides an invaluable resource to interested parties to specifically target users in respect of various activities or interactions that they have undergone in accessing a particular web site. Furthermore, it provides additional information to owners of monitored web sites as to how many visits or interactions/responses unmonitored web sites (being potential competitors to such owners) have had from the internet audience, based on the two or more sources of data, from the site-centric measurements and/or from the user centric measurements, or simply based on the site-centric measurements. Thus more information is available about the behavior of the internet population or audience.

In an aspect, a method of estimating Internet traffic includes identifying one or more characteristics related to which it is desired to estimate Internet traffic, determining a fraction of a target population including users displaying the characteristic by analysis of a census-based measurement of internet traffic for at least one website, receiving clickstream data at a host processing facility from a group of participants that connotes Internet activity of individual members of the group of participants, the Internet activity relating to at least one website, identifying a fraction of the group of participants that share the one or more characteristics, determining a behavioral composition by scaling the fraction of the group of participants by the fraction of the target population, and producing, at the host processing facility, an estimate of the target population's activity with respect to at least a part of the Internet that includes the at least one website by scaling the clickstream data for the subset of the group of participants by applying a weight based on the behavioral composition and the relative size of the target population. Refining the estimate of the target population's Internet activity may be done by applying a global inflation factor to the estimate. The one or more characteristics may relate to at least one of an internet browsing behavior, a demographic characteristic, and a geographic characteristic. The weight may be used to scale the clickstream data for the subset of the group of participants with respect to a plurality of websites. Refining the estimate may be done by iteratively applying a weight based on one or more of a demographic composition and a geographic composition of the target population to the estimate.

In an aspect, a computer-implemented system for estimating Internet traffic may include an analysis facility, operating on at least one processor, that determines a fraction of a target population including users displaying one or more characteristics related to which it is desired to estimate Internet traffic by analysis of a census-based measurement of internet traffic for at least one website, a host processing facility that receives clickstream data from a group of participants that connotes Internet activity of individual members of the group of participants, the Internet activity relating to at least one website, and an analysis facility, operating on at least one processor, that determines a behavioral composition by scaling the fraction of the group of participants that share the one or more characteristics by the fraction of the target population, wherein an estimate of the target population's activity with respect to at least a part of the Internet that includes the at least one website is produced at the host processing facility by scaling the clickstream data for the subset of the group of participants by applying a weight based on the behavioral composition and the relative size of the target population. The estimate of the target population's Internet activity may be refined by applying a global inflation factor to the estimate. The one or more characteristics may relate to at least one of an internet browsing behavior, a demographic characteristic, and a geographic characteristic. The weight may be used to scale the clickstream data for the subset of the group of participants with respect to a plurality of websites. The estimate may be refined by iteratively applying a weight based on one or more of a demographic composition and a geographic composition of the target population to the estimate.

Figure 4:
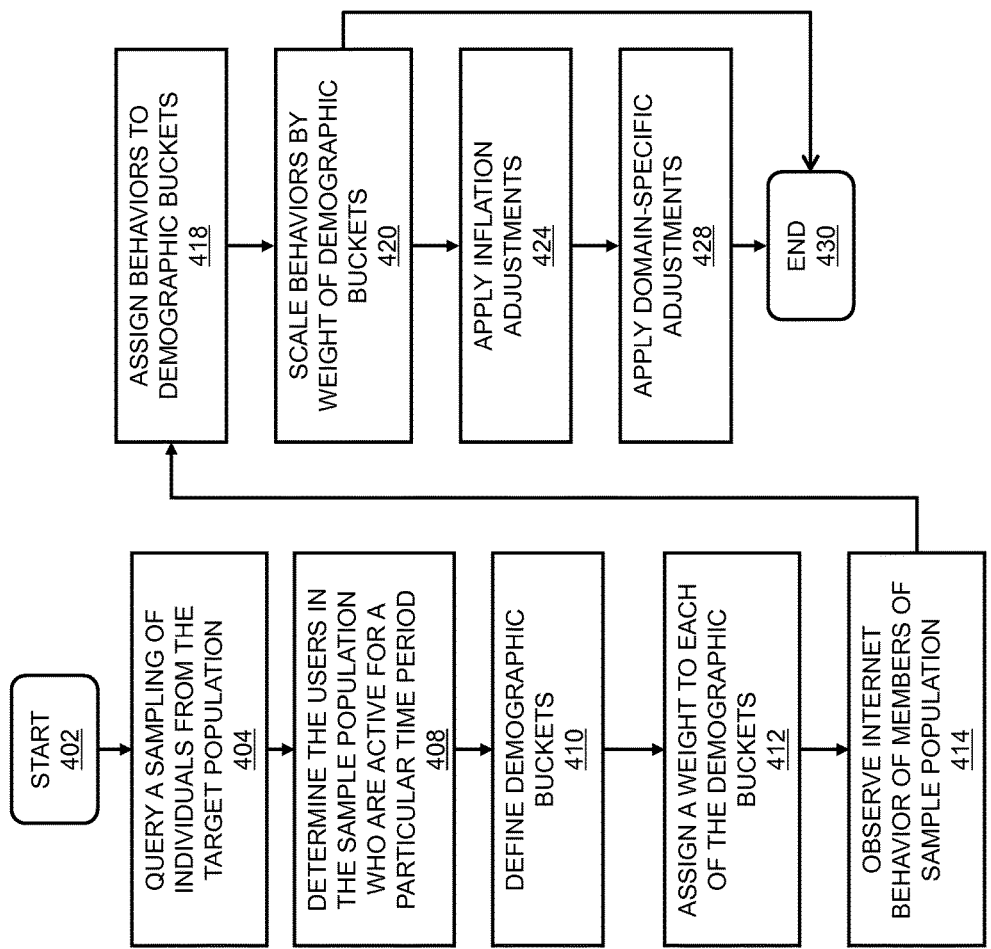
FIG. 4 depicts a flow chart of a dynamic normalization process.

Referring now to FIG. 4, a system and method for dynamic normalization is described. The logical flow for this process is similar to the standard normalization process described in connection with FIG. 2 with some key differences. In embodiments reflected by FIG. 2, an omnibus survey to obtain a periodic, e.g., monthly, census can be used to select panelists, and conventional normalization of the users' clickstream data, as previously described herein, can be applied to project population data and determine the monthly clickstream activity for each demographic bucket. With dynamic normalization as shown in FIG. 4, the clickstream data for a longer period, such as a month, can be examined to obtain clickstream data for a shorter period, such as a day, by determining how many users in the demographic bucket were active in particular sub-periods, such as each and every day.

Referring still to FIG. 4, process flow begins with querying a more or less random sampling of individuals from the target population to obtain a certain threshold number of panelists whose internet behavior is observed at logical block 404. Then, the panelists are limited to those users who are displaying browsing activity at the particular time of the query at logical block 408. For example, only those users who are active on a particular day or part of a day can possibly be selected as panelists for that time. Alternatively, processing flow may begin by first limiting the sample population to those users who are active during a time period. Then those active users may be further queried to determine their demographic information.

Further steps in the process can be carried out after the active user is selected to a panel at logical block 408, such as defining demographic buckets in which to place the user at logical block 410 and assigning the users in each demographic bucket a weight at logical block 412, the weight being how many members of the target population that each member of the sample population represents for the time period in question, such as that day. In this embodiment, a user can get a weight for each time period, e.g. day, that the user is active and selected to a panel. Optionally, an aggregate weight may be obtained by combining weights across multiple time periods that the user is active to get an aggregate weight for a time period. The Internet behavior of users is observed over a time period at logical block 414 and assigned to the appropriate demographic bucket at logical block 418. Internet behavior may be scaled by the weight for the time period or the aggregate weight of the user at logical block 420 to project up to an estimate of the Internet behaviors of the target population. Either processing flow ends 430 after this step, or various bias adjustments may optionally be applied to the data, such as inflation adjustments at logical block 424 to account for attrition and domain-specific adjustments at logical block 428, after which processing flow ends 430.

In an embodiment, panel clickstream data that have been dynamically normalized by the process shown in FIG. 4 may be useful in the hybrid process described in FIG. 3, which describes a hybrid internet traffic measurement approach combining panel data with site-centric, or census-based, measurements.

In another embodiment of dynamic normalization, clickstream data for a panel may be normalized for each day. In order to forecast the percent of a population of interest that is expected to be online on any particular day, data from various sources, such as from third parties, such as a census bureau and the World Bank, may be obtained to first estimate the internet browsing population (IBP). For example, census bureau data may provide the total number of people in a population, such as the number of people in the United States. In another example, data from the World Bank may provide the internet-enabled population in an area, such as a country, city, continent, region, or the like. In embodiments, data from the World Bank may be taken for the same area as the census bureau data so that taken together, the data from the census bureau data and World Bank may provide an estimate of the IBP on any given day for the area. In order to refine the estimate of the IBP, consideration may be given to the particular day of interest and how the IBP may shift given the particular day. In embodiments, clickstream data may be taken from various panels of panelists, such as panels formed by an Internet Service Provider (ISP), an Application Service Provider (ASP), a proprietary panel of a host or operator of the methods and systems disclosed herein, and/or third-party panel organizer, and so on. These panels may include people whose browsing activity is collected by various methods, such as a browser plug-in executing on the user's computer, a review of logs, histories, or memory structures on the user's computer, server logs, keystroke capturing, or other clickstream capture facilities, or in other embodiments, via a mobile application or mobile device capability. In typical scenarios, panelists may join the panel and leave the panel. Because of this attrition, a full month of clickstream data may not be available for any given individual; thus, clickstream data for the panel taken for a full month, but that is weighted at a level of detail more granular than month, such as on the basis of a day or part of a day, may be biased by the fact that some people were only active for a portion of the days. Further, panelists may not be actively online on any particular day. Thus, a need exists to account for missing or inactive panelists when using panel clickstream data as an estimate of the activity of the entire IBP, so that regardless of how many people are in the panel, the daily activity can be weighted accordingly.

In an embodiment, an algorithm, such as a regression algorithm, may be used that controls for the proportion of panelists coming from each panel providing clickstream data to build a model to predict variation in IBP by day. The daily IBP model may include a set of coefficients, and those coefficients may answer the question: controlling for the proportion of panelists that could be coming from any panel, given the day of the week, what proportion of those people are active on a desktop computer? Likewise, the question can be directed to determining the proportion of people active on a mobile device. For example, for a panel of 1000 people, it would be wrong to assume that all 1000 people are active every day of the week. For example, 800 people from the panel may be online on a particular Saturday, while all the panelists may be online on a particular Monday, but on any given Sunday, only 500 may be online. Using these sorts of activity data, the algorithm can build an IBP model for the particular Saturday that predicts that only 80% of the IBP would even be online at all on the particular Saturday, that 100% would be online on the particular Monday, and that only 50% are likely online on any Sunday. As clickstream data are collected from each panel and scaled up to the IBP for analysis, the daily IBP model that predicts the variation in IBP by day is also used in the scaling. For example, instead of trying to scale the clickstream data to all of the IBP, the clickstream data are only scaled to the proportion of the IBP that are predicted to be active based on the daily IBP model. In other words, instead of using a static IBP number such as 310 million mentioned herein, a new IBP can be determined on a daily basis based on the daily IBP model, and thus each day, each panelist gets a new weighting in other normalizing and scaling operations that are executed upon the panelist's clickstream data. For example, if the daily IBP model predicts that only 50% of the general IBP is active on a Sunday, thus instead of 310 million, then the IBP in the United States is really 155 million on Sundays. Then, clickstream data are scaled to the new IBP. Continuing with this example, perhaps the panel comprises 1000 people who were active on Sunday, and 200 of those active people (20%) visited a sports website. This activity can be scaled up to the Sunday IBP to estimate that 31,000,000 people visited the sports website on Sunday (i.e., 20% of the Sunday-active IBP of 155 million). If the static IBP had been used, the number of visitors to the sports website would have been incorrectly estimated as being 62,000,000 (i.e., 20% of the entire IBP of 310 million).

In order to calibrate the daily IBP model, a calibration survey may be launched periodically, such as twice a year, to a population of users who are not in the clickstream panel to find out on a given day if the user was active on the internet, using a particular device, how many devices they use to browse the internet, and the like. For example, 1000 people not in the clickstream panel may be surveyed for seven days straight, and the acquired data may be compared to the daily IBP model. The daily IBP model solves the problem of attrition from the panel, since the data are not being normalized on a monthly basis, but rather, on a daily basis.

In an aspect, a method of estimating Internet traffic may include taking a size of a target population based on a published data source 502, and identifying a fraction of participants within a clickstream panel that is managed by a party other than the publisher of the data source that were active in a time period 504. The time period may be a predetermined time period, a specified time period, and so forth, which can include, e.g., a day of the week, a 24-hour period, a calendar day, a business day, a holiday, or any other time period. The method may further include receiving clickstream data at a host processing facility from the clickstream panel that connotes Internet activity of the fraction of participants within the clickstream panel 508. One skilled in the art will recognize that participants within the clickstream panel may include members of the clickstream panel and vice-versa. Thus, unless a different meaning is explicitly stated or otherwise clear from the context, any reference to participants of the clickstream panel may also or instead include members of the clickstream panel and vice-versa. The method may further include producing, at the host processing facility, an estimate of the target population's Internet activity by scaling the data for each member of the clickstream panel by a scaling factor that is based on the size of the target population relative to the fraction of the participants within the clickstream panel active during the time period 510. The method may further include refining the estimate of the target population's Internet activity by applying a bias adjustment to the estimate, wherein applying the bias adjustment to the estimate comprises adjusting the fraction active during the time period based on the time period being at least one of a holiday, a day of the week, a day in an identified season, and a time period that is subject to an identified exogenous effect. The bias adjustment may also include a structural bias adjustment. The structural bias may occur when a daily activity is at least one of overrepresented and underrepresented due to the makeup of the sample population, wherein the bias adjustment activity is calculated using generalized linear regression models. The Internet activity may include a physical activity of the individual members of the clickstream panel, the physical activity selected from the group consisting of clicking, dwelling, and viewing. The published data source may be at least one of census data and third party data. The exogenous effect may be at least one of a known weather event, a major news event, a major sporting event, an act of nature, and an act of war.

In another embodiment of dynamic normalization, the variety of panel providers may pose a problem of bias in representation of the general IBP. Depending on the variation, the panels may be more or less representative of what is happening in the Internet over a particular time period. In certain embodiments, demographics may be used to account for any biases, but demographics may not be a good indicator of overall internet activity. In embodiments, behavioral anchors may be used to account for biases introduced by using varied panels. In general, there are categories of behavioral anchors that can be used to describe internet browsing activity. In some embodiments, eight or nine different behavioral anchors may be used to categorize the majority of the IBP's activity. The behavioral anchors include browsing behaviors relating to certain types of content or activities that are undertaken using the internet, such as social media, news, shopping, and the like. For example, on any given day, it may be observed that 20% of the IBP undertake some shopping on the internet, such as indicated by industry reports, internal client tracking of behavior, or online surveys of customer behavior, and this observable behavior becomes a behavioral anchor, or given, about a particular behavior, i.e., online shopping. Having established a static behavioral anchor for the IBP, the clickstream panel may then be examined to see what proportion of it shopped on the internet. In theory, an unbiased or "normal" panel might be expected to mirror the IBP, so 20% of the panel should have displayed a shopping behavior during a day of browsing activity. If the percentage engaging in shopping diverges from 20%, then the actual number measured from the panel may be stored, such as being stored as a vector, and data for the panel may be normalized in accordance with the established static behavioral anchor for the IBP. For example, if the clickstream panel only exhibited a 10% incidence of shopping behavior within the panel, then the panelists exhibiting that behavior may be scaled by a factor of two when normalizing to the IBP with respect to estimates that use or predict shopping behavior, in order to more accurately represent the 20% shopping behavior typical of the IBP.

In an aspect, a method of estimating Internet traffic may include taking a size of a target population based on a published data source 602, identifying a percentage of the target population that displays an online behavior 604, receiving clickstream data at a host processing facility from a clickstream panel operated by a party other than the publisher of the published data source that connotes Internet activity of all members of the clickstream panel 608, identifying a fraction of members of the clickstream panel that exhibit the online behavior 610, calculating a scaling factor for the fraction of members of the clickstream panel by dividing the percentage of the target population that displays the online behavior by the fraction of members of the clickstream panel that exhibit the online behavior 612, and producing, at the host processing facility, an estimate of the target population's Internet activity by scaling the clickstream data for the members of the clickstream panel exhibiting the online behavior by the scaling factor and scaling the clickstream data for all members of the clickstream panel by the relative size of the target population 614. The online behavior may include at least one of a website visited, a URL visited, a category of websites/URLs visited, an activity engaged in online, a shopping behavior, an entertainment behavior, a news behavior, a reading behavior, a financial services behavior, an interaction with a bank or financial service provider, watching a show or movie, using a specific email provider, streaming music, conducting a search query, and an activity during a predetermined time period.

In embodiments, the behavioral anchor may not be static and may vary according to the day, the season, a holiday, a selected time period, and the like. Continuing with the example of a shopping behavioral anchor, on a particular day, such as Cyber Monday, the static 20% behavioral anchor may not be a good estimate of the shopping behavior in the IBP. For example, on a day like Cyber Monday, 45% of the IBP may be expected to shop on the internet. Behavioral anchors may vary dynamically by day, such as in accordance with observed, current behavior in the IBP (to the extent published) and by variations or bias in the clickstream panel. Thus, a static behavior anchor may not useful in normalizing clickstream panel activity because the panel might be biases. In the clickstream panel, an algorithm, such as a regression algorithm, may remove this bias and control for the variation in panel composition. The algorithm may be used to adjust the benchmark anchor for the day or selected time period. Behaviors may be observed in the clickstream panel, and an expected percentage of a particular behavior may be determined for the day given the composition of the panel. The variance in odds-ratio between observed and expected data may be used to create a dynamic benchmark behavioral anchor for the time period. An example of social network activity will be used to illustrate the concept of the dynamic behavioral anchor. According to surveys or reports, a static behavioral anchor may be established for the IBP that suggests 80% of the IBP typically visit a social networking site per day. The composition of clickstream panels may not mirror that of the IBP, so the inherent bias in the panel may lead to variations in observed activity for the panel versus what is expected based on the static behavioral anchor. Further, on any given day, there may be additional variation in panel activity due to some unforeseen event. Thus, in order to accurately normalize clickstream panel data, an algorithm may control for the bias in the panel composition as well as the dynamic variation in activity for the day. For example, on any given day, the expected odds of observing the social networking activity in the IBP is 80%, but in the exemplary panel, given the bias in the panel composition (e.g. the panel is an older demographic, etc.) the odds are 1:1 (50%) that a panel member will visit a social networking site on that day. Continuing with the example, say an unforeseen event occurs, and people who normally wouldn't be social networking are in fact doing so on this now special day. In the exemplary panel, on this special day of the unforeseen event, 67% of the panel is actually observed (2:1 odds) visiting a social networking site. This incremental difference between what was expected for the panel given its biased composition (50%, or 1:1 odds) and what was actually observed (67%, or 2:1 odds) is used to adjust the static behavioral anchor for the IBP. These calculations make use of odds rather than percentages so that no behavioral anchor exceeds 100%. Thus, the odds that the social networking activity actually occurred on the special day is estimated to be 2× normal (2:1/1:1) based on the panel activity. The static behavioral anchor for the social networking activity on the special day is adjusted accordingly. Continuing with the example, the static behavioral anchor for the IBP is 80% (4:1 odds), but because the odds on the special day are 2× normal, then the static behavioral anchor for that particular day would be recalculated to 88.8% (or 4:1 odds×2 gives 8:1 odds). This new 88.8% static behavioral anchor may now be used in normalizing the clickstream data. The new static behavioral anchor is included as a marginal in a weighting function of clickstream data that ensures that, during the time period, the weight given to individuals observed doing that anchor, which is 67% of the panel in this example, sums to 88.8%. Continuing with this example, before normalizing the clickstream data to relative size of the IBP, the 67% of the panel observed visiting social networking sites on the special day are now weighted so that the activity of the panelists exhibiting that behavior is representative of the IBP. This is done by applying a scaling factor, which is calculated by dividing the new behavioral anchor by the observed percentage of panelists engaging in the behavior. For this example, 88.8% is divided by 67% to give a 1.33× scaling factor for each panelist observed visiting social networking sites on the special day.

In embodiments, the dynamic variation of the behavioral anchor may be in accordance with the convergence of industry reports or other $3^{rd}$ party data, observed panel behavior, and expected behavior on the day given the historical relationship to panel composition.

In an aspect, a method of estimating Internet traffic may include taking a size of a target population based on data from a published data source 702, taking a percentage of the target population that displays an online behavior based on the data to obtain a behavioral anchor 704, determining expected odds that a member of a clickstream panel operated by a party other than the publisher of the data source will exhibit the online behavior for a time period (e.g., a predetermined or specified time period) given the composition of the clickstream panel 708, receiving clickstream data at a host processing facility from the clickstream panel that connotes Internet activity of individual members of the clickstream panel 710, identifying an observed percentage of the clickstream panel that actually exhibited the online behavior and expressing this percentage as actual odds 712, calculating an odds ratio for observed behavior versus expected behavior, wherein the actual odds that the online behavior actually occurred during the time period is estimated to differ from the expected odds by a factor of the odds ratio 714, modifying the behavioral anchor by expressing the behavioral anchor as behavioral odds and multiplying the behavioral odds by the odds ratio to produce a dynamic behavioral anchor 718, and producing, at the host processing facility, an estimate of the target population's Internet activity by scaling the clickstream data for the participants in the clickstream panel exhibiting the online behavior so that it matches the dynamic behavioral anchor and scaling the clickstream data for all members of the clickstream panel by the relative size of the target population 720. The online behavior may include at least one of a website visited, a URL visited, a category of websites/URLs visited, an activity engaged in online, a shopping behavior, an entertainment behavior, a news behavior, a reading behavior, a financial services behavior, an interaction with a bank or financial service provider, watching a show or movie, using a specific email provider, streaming music, conducting a search query, and an activity during a predetermined time period.

In another embodiment of dynamic normalization, through the calibration survey, an estimate of how many devices are used in being active on the internet is obtained for a particular number of users and this estimate may be used to generate a device weighting factor. The device weighting factor or device weight is used as a factor account for missing devices. The device weight may be derived comparing the self-reported devices per users (target population) reported through a survey and the devices per user observed in the clickstream during the time period. For example, the calibration survey may determine that each user in the target population uses two devices to access the internet on a daily basis. Then, in the clickstream panel data, there should be activity from at least two different device or browser identifiers for each panelist. Since scaling is done on the basis of the panelist, if only one device or browser is found to be associated with a panelist in the panel data, but two device or browser identifiers were expected based on the numbers obtained from the target population, then the activity for the panelist may be scaled up by 2 to account for the activity from the missing device in the clickstream.

In an aspect, a method of estimating Internet traffic, taking a size of a target population based on a published data source 802, taking a number of devices in use by each member of the target population to access the internet 804, receiving clickstream data at a host processing facility from the clickstream panel that connotes Internet activity of members of the clickstream panel 808, calculating a device weighting factor for a clickstream by dividing the number of devices expected to be in use by each member of the target population by the number of devices that contributed to a user's clickstream 810, and producing, at the host processing facility, an estimate of the target population's Internet activity by scaling the clickstream data for each member of the clickstream panel by a scaling factor that is based on the size of the target population and the device weighting factor 812.

In another embodiment of dynamic normalization, the hours during which panelists are observed submitting clicks may be used as input to a static behavioral anchor to further ensure stability in estimated activity. For example, if historically 20% of panelists are observed to be active online between the hours of 6 am to 9 am EST when weighted properly for behavior and demographics, and in a given day the active panelist between the hours of 6 am to 9 am are estimated to be 15%, those panelists active during that time will be scaled to 1.33×.

While only a few embodiments have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. Embodiments may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method of estimating Internet traffic, the method comprising:
    determining a size of a target population based on a data source;
    identifying a fraction of participants within a clickstream panel that is managed by a party other than a publisher of the data source that were active in a predetermined time period;
    receiving clickstream data at a host from the party that connotes Internet activity of the fraction of participants within the clickstream panel; and
    determining, at the host, an estimate of the target population's Internet activity by scaling the clickstream data for each member of the clickstream panel by a scaling factor that is based on the size of the target population relative to the fraction of the participants within the clickstream panel active during the predetermined time period.

2. The method of claim 1, further comprising refining the estimate of the target population's Internet activity by applying a bias adjustment to the estimate.

3. The method of claim 2, wherein the bias adjustment includes a structural bias adjustment.

4. The method of claim 3, wherein the structural bias adjustment is based on a daily activity that is overrepresented and underrepresented due to a makeup of a sample population.

5. The method of claim 2, wherein applying the bias adjustment to the estimate comprises adjusting the fraction of participants active during the predetermined time period based on the predetermined time period being at least one of a holiday, a day of a week, a day in an identified season, and a time period that is subject to an identified exogenous effect.

6. The method of claim 5, wherein the identified exogenous effect is at least one of a weather event, a news event, a sporting event, an act of nature, and an act of war.

7. The method of claim 2, wherein the bias adjustment is calculated using generalized linear regression models.

8. The method of claim 1, wherein the Internet activity comprises clicking, dwelling, or viewing of individual members of the clickstream panel.

9. The method of claim 1, wherein the data source is at least one of census data and third party data.

10. A method of estimating Internet traffic, the method comprising:
   determining a size of a target population based on a data source;
   taking a number of devices in use by each member of the target population to access the Internet;
   receiving clickstream data at a host from a party other than a publisher of the data source that connotes Internet activity of members of a clickstream panel;
   calculating a device weighting factor for a clickstream by dividing a number of devices expected to be in use by each member of the target population by a number of devices that contributed to a user's clickstream; and
   determining, at the host, an estimate of the target population's Internet activity by scaling the clickstream data for each member of the clickstream panel by a scaling factor that is based on the size of the target population and the device weighting factor.

11. The method of claim 10, wherein the number of devices in use by each member of the target population to access the Internet is determined through a survey.

12. The method of claim 10, wherein the Internet activity comprises clicking, dwelling, or viewing of individual members of the clickstream panel.

13. The method of claim 10, wherein the data source is at least one of census data and third party data.

14. A method of estimating Internet traffic, the method comprising:
   determining a size of a target population based on a data source;
   identifying a percentage of the target population that displays an online behavior;
   receiving clickstream data at a host from a party other than a publisher of the data source that connotes Internet activity of all members of a clickstream panel;
   identifying a fraction of members of the clickstream panel that exhibit the online behavior;
   calculating a scaling factor for the fraction of members of the clickstream panel by dividing the percentage of the target population that displays the online behavior by the fraction of members of the clickstream panel that exhibit the online behavior; and
   determining, at the host, an estimate of the target population's Internet activity by scaling clickstream data for members of the clickstream panel exhibiting the online behavior by the scaling factor and scaling the clickstream data for all members of the clickstream panel by a relative size of the target population.

15. The method of claim 14, wherein the online behavior includes at least one of a website visited, a URL visited, a category of websites/URLs visited, an activity engaged in online, a shopping behavior, an entertainment behavior, a news behavior, a reading behavior, a financial services behavior, an interaction with a bank or financial service provider, watching a show or movie, using a specific email provider, streaming music, conducting a search query, and an activity during a predetermined time period.

16. The method of claim 14, wherein the data source is at least one of census data and third party data.

17. The method of claim 14, wherein the Internet activity comprises clicking, dwelling, or viewing of individual members of the clickstream panel.

18. The method of claim 14, wherein the data source is at least one of census data and third party data.

* * * * *